(12) United States Patent
Okita et al.

(10) Patent No.: US 10,294,854 B2
(45) Date of Patent: May 21, 2019

(54) SADDLE-RIDDEN VEHICLE

(71) Applicant: SUZUKI MOTOR CORPORATION, Hamamatsu-shi, Shizuoka (JP)

(72) Inventors: Kazuhiro Okita, Hamamatsu (JP); Takaya Suzuki, Hamamatsu (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 291 days.

(21) Appl. No.: 15/335,044

(22) Filed: Oct. 26, 2016

(65) Prior Publication Data

US 2017/0114709 A1    Apr. 27, 2017

(30) Foreign Application Priority Data

Oct. 27, 2015  (JP) ................. 2015-210451
Oct. 27, 2015  (JP) ................. 2015-210452
Oct. 27, 2015  (JP) ................. 2015-210453

(51) Int. Cl.
  *F02B 29/04*  (2006.01)
  *F02B 61/02*  (2006.01)
  (Continued)

(52) U.S. Cl.
  CPC .......... *F02B 29/0406* (2013.01); *F02B 37/00* (2013.01); *F02B 61/02* (2013.01);
  (Continued)

(58) Field of Classification Search
  CPC ...... F02B 29/0406; F02B 37/00; F02B 61/02; F02M 35/048; F02M 35/10255;
  (Continued)

(56) References Cited

U.S. PATENT DOCUMENTS 4,565,178 A * 1/1986 Nagase .................. F02B 29/00
                                                          123/564
5,499,604 A * 3/1996 Ito ........................ F01M 13/021
                                                          123/41.86

(Continued)

FOREIGN PATENT DOCUMENTS

| DE | 10 2014 111 719 A1 | 4/2015 |
| EP | 2 075 181 A2 | 1/2009 |
| JP | 2015-74242 A | 4/2015 |
| JP | 2015-78634 A | 4/2015 |

OTHER PUBLICATIONS

German Office Action dated Feb. 13, 2017, issued to the corresponding German Application No. 10 2016 012 823.2.

*Primary Examiner* — Joseph M Rocca
*Assistant Examiner* — Felicia L. Brittman
(74) *Attorney, Agent, or Firm* — Stein IP, LLC

(57) ABSTRACT

There is provided a saddle-ridden type vehicle. An air intake piping is connected between an air cleaner and a supercharger. An air outlet piping is connected between the supercharger and an intercooler. An air bypass passage is provided between the air outlet piping and the air intake piping to allow compressed air to escape toward an upstream side of the supercharger without flowing in the supercharger. An air bypass valve is configured to open and close the air bypass passage. The supercharger is disposed in front of the engine. The air cleaner is disposed above the engine. The air intake piping extends in an upper-lower direction in a region ranging from the above of the engine to a front of the engine at one side in a vehicle width direction. The air bypass valve is disposed at the rear of the air intake piping.

18 Claims, 22 Drawing Sheets

(51) Int. Cl.
*F02M 35/04* (2006.01)
*F02M 35/10* (2006.01)
*F02B 37/00* (2006.01)

(52) U.S. Cl.
CPC .... *F02M 35/048* (2013.01); *F02M 35/10255* (2013.01); *F01P 2050/16* (2013.01); *F01P 2060/02* (2013.01); *Y02T 10/144* (2013.01); *Y02T 10/146* (2013.01)

(58) Field of Classification Search
CPC .. Y02T 10/144; Y02T 10/146; F01P 2060/02; F01P 2050/16; B62K 11/00
USPC ....................................................... 180/218
See application file for complete search history.

(56) References Cited

U.S. PATENT DOCUMENTS

| | | | | |
|---|---|---|---|---|
| 6,021,764 | A | * | 2/2000 | Koyama ............. F02B 29/0475 123/563 |
| 8,857,552 | B2 | | 10/2014 | Oltmans ........................ 180/219 |
| 2012/0260896 | A1 | | 10/2012 | Saeki et al. |
| 2012/0267182 | A1 | | 10/2012 | Saeki et al. |
| 2013/0282256 | A1 | * | 10/2013 | Watanuki ................ F02D 23/02 701/102 |
| 2015/0107923 | A1 | | 4/2015 | Inayama |
| 2016/0245199 | A1 | * | 8/2016 | Pursifull .......... F02M 35/10222 |

* cited by examiner

SADDLE-RIDDEN VEHICLE

CROSS-REFERENCE TO RELATED APPLICATIONS

The disclosure of Japanese Patent Application No. 2015-210451 filed on Oct. 27, 2015, Japanese Patent Application No. 2015-210452 filed on Oct. 27, 2015, and Japanese Patent Application No. 2015-210453 filed on Oct. 27, 2015, including specification, drawings and claims is incorporated herein by reference in its entirety.

TECHNICAL FIELD

The disclosure relates to a saddle-ridden type vehicle having a supercharger.

BACKGROUND

A saddle-ridden type vehicle such as a motorcycle is provided with a supercharger and air compressed by the supercharger is supplied to a combustion chamber of an engine, so that it is possible to increase a thermal efficiency and an output of the engine. Patent Document 1 discloses a saddle-ridden type vehicle having a supercharger.

The saddle-ridden type vehicle disclosed in Patent Document 1 has an air cleaner configured to purify exterior air, a supercharger configured to compress the air purified by the air cleaner, an intercooler configured to cool the air of which a temperature has increased resulting from the compression by the supercharger, and a surge tank configured to temporarily store therein the air cooled by the intercooler and to supply the same to an engine. Also, in the saddle-ridden type vehicle, the air cleaner and the supercharger are interconnected by an air intake piping. Also, the supercharger and the intercooler are interconnected by an air outlet piping. Also, the intercooler and the surge tank are disposed adjacent to each other and are directly connected via a short pipe line.

Further, the saddle-ridden type vehicle disclosed in Patent Document 1 has an air bypass piping configured to allow the compressed air downstream of the supercharger to escape toward an upstream side of the supercharger without flowing the compressed air in the supercharger and an air bypass valve configured to open and close the air bypass piping. The air bypass piping and the air bypass valve have a function of escaping the compressed air downstream of the supercharger toward the upstream side of the supercharger to prevent a pressure in the air outlet piping downstream of the supercharger from excessively increasing when a throttle valve configured to adjust an inflow amount of air intake to the engine is completely closed.

In the saddle-ridden type vehicle disclosed in Patent Document 1, the air cleaner is disposed at a lower-rear side of the engine, the supercharger is disposed at a lower-front side of the engine and the intercooler and the surge tank are disposed at the rear of the engine. The air intake piping extends in a front-rear direction at a lower-left side of the engine, and the air outlet piping extends in the front-rear direction with traversing laterally a cylinder or cylinder head of the engine.

Also, the air bypass valve is positioned at the rear of a left side of the supercharger and at the front of a left side of a crank case and is provided at a substantially intermediate position of the air intake piping. Also, the air bypass valve is positioned at an inner side of the saddle-ridden type vehicle relative to the air intake piping. Also, the air bypass piping is disposed in front of the left side of the crank case (refer to an air bypass valve 36 and an air bypass hose 37 in FIG. 9 of Patent Document 1).

Patent Document 1: Japanese Patent Application Publication No. 2015-78634A

In a vehicle including an engine having a supercharger, when the air bypass valve opens, the air flows from the downstream side toward the upstream side of the supercharger via the air bypass valve, so that an air shooting sound "shoo" is generated. The air shooting sound is a sound inherent to the engine having the supercharger and is one of charms of the engine having the supercharger.

In the saddle-ridden type vehicle disclosed in Patent Document 1, since the air bypass valve is disposed at a position corresponding to a lower part of the crank case of the engine and the air bypass valve is located at a low position, a head of a driver sitting on a seat of the saddle-ridden type vehicle and the air bypass valve are spaced from each other. As a result, it is difficult for the driver to hear the air shooting sound upon the opening of the air bypass valve.

Also, the air bypass valve is disposed at the inner side of the saddle-ridden type vehicle relative to the air intake piping, so that it is located at a position below the engine, as seen from the driver sitting on the seat of the saddle-ridden type vehicle. For this reason, the engine is interposed between the head of the driver and the air bypass valve, so that it is difficult for the air shooting sound to reach ears of the driver upon the opening of the air bypass valve.

Also, in order to express the charms of the engine having the supercharger, the air bypass valve is preferably disposed at a position at which it can be easily seen from an outside. Regarding this, according to the saddle-ridden type vehicle disclosed in Patent Document 1, since the air bypass valve is disposed below the engine and at the inner side of the saddle-ridden type vehicle, the air bypass valve is difficult to be seen from the outside.

In the meantime, it is necessary to protect the air bypass valve from collision with flying stones during traveling.

Patent Document 2 also discloses a saddle-ridden type vehicle having a supercharger.

The saddle-ridden type vehicle disclosed in Patent Document 2 has an air cleaner configured to purify exterior air, a supercharger configured to compress the air purified by the air cleaner, an intercooler configured to cool the air of which a temperature has increased resulting from the compression by the supercharger, and a surge tank configured to temporarily store therein the air cooled by the intercooler and to supply the same to an engine. Also, in the saddle-ridden type vehicle, the air cleaner and the supercharger are interconnected by an air intake piping. Also, the supercharger and the intercooler are interconnected by an air outlet piping. Also, the intercooler and the surge tank are disposed adjacent to each other and are directly connected via a short pipe line.

Patent Document 2: Japanese Patent Application Publication No. 2015-74242A

The saddle-ridden type vehicle configured to compress the air by the supercharger and to supply the same to the engine has more components of an intake system, as compared to natural intake, because the supercharger, the intercooler, the air outlet piping configured to interconnect the same, and the like are provided. Also, in the supercharger (turbocharger) configured to drive a turbine by using an exhaust gas of the engine, it is necessary to smoothly supply the exhaust gas to the turbine of the supercharger. Therefore, it is preferably to dispose the supercharger in the vicinity of an exhaust port provided at a front part of the engine. Due to this, the supercharger is disposed in front of the engine in many cases. On the other hand, since an intake port of the engine is provided at a rear part of the engine, the surge tank configuring a downstream-side of the intake system is disposed at the rear of the engine in many cases. Further, an arrangement place of the air cleaner is limited due to a relation with a layout of a path (a duct and the like) configured to guide the exterior air, which is to be used for combustion of fuel, to the air cleaner. Also, an arrangement place of the intercooler is limited due to a relation with a layout of a path configured to guide the exterior air, which is to be used for cooling of the compressed air, to the intercooler. Due to the situations, in the saddle-ridden type vehicle having the supercharger, it is difficult to determine arrangement of the components of the intake system and the intake pipings configured to interconnect the components around the engine.

In the saddle-ridden type vehicle of Patent Document 2, the air cleaner is disposed at a lower-rear side of the engine, the supercharger is disposed at a lower-front side of the engine, and the intercooler and the surge tank are disposed at the rear of the engine. Also, the air inlet piping configured to interconnect the air cleaner and the supercharger is piped at a side below the engine and the piping configured to interconnect the supercharger and the intercooler traverses laterally the cylinder or cylinder head of the engine.

When it is intended to improve a design property of the saddle-ridden type vehicle, an outward appearance of the engine as seen from a side is important. When the air outlet piping traverses laterally the cylinder or cylinder head of the engine, like the saddle-ridden type vehicle of Patent Document 2, the outward appearance of the engine as seen from a side is deteriorated, so that the design property of the saddle-ridden type vehicle may be lowered.

Also, when the air intake piping or the air outlet piping is disposed at the side of the engine, like the saddle-ridden type vehicle of Patent Document 2, the traveling wind is difficult to collide with the side of the engine, so that it is difficult to sufficiently cool the engine. Also, when the piping is disposed at the side of the engine, an empty space at the side of the engine is reduced, so that it is difficult to secure a space for disposing the components at the side of the engine. Also, when the piping is disposed at the side of the engine, a vehicle width of the saddle-ridden type vehicle increases, so that a lightsome handling property of the saddle-ridden type vehicle may be deteriorated.

SUMMARY

It is therefore an object of the disclosure to provide a saddle-ridden type vehicle capable of protecting an air bypass valve, expressing the air bypass valve and increasing charms of an engine having a supercharger.

Another object of the disclosure is to provide a saddle-ridden type vehicle capable of improving a design property of the saddle-ridden type vehicle, cooling performance of an engine or and a handling property of the saddle-ridden type vehicle and easily securing an arrangement space for components to be provided in the engine.

According to a first aspect of the embodiments of the present invention, there is provided a saddle-ridden type vehicle comprising: an engine having a cylinder and a cylinder head above a crank case; an air cleaner configured to purify air for fuel combustion; a supercharger configured to compress the air purified by the air cleaner; an intercooler configured to cool the air compressed by the supercharger and to supply the air to the engine; an air intake piping connected between the air cleaner and the supercharger and configured to supply the air purified by the air cleaner to the supercharger; an air outlet piping connected between the supercharger and the intercooler and configured to supply the air compressed by the supercharger to the intercooler; an air bypass passage provided between the air outlet piping and the air intake piping and configured to allow the compressed air downstream of the supercharger to escape toward an upstream side of the supercharger without flowing the compressed air in the supercharger; and an air bypass valve configured to open and close the air bypass passage, wherein the supercharger is disposed in front of the engine, wherein the air cleaner is disposed above the engine, wherein the air intake piping extends in an upper-lower direction in a region ranging from the above of the engine to a front of the engine at one side in a vehicle width direction, and wherein the air bypass valve is disposed at the rear of the air intake piping.

According to the above aspect of the disclosure, the air bypass valve is disposed at the rear of the air intake piping extending in the upper-lower direction in the region ranging from the upper of the engine to the front thereof at one side in the vehicle width direction, so that it is possible to heighten a position of the air bypass valve. Thereby, it is possible to shorten a distance between a head of a driver sitting on a seat of the saddle-ridden type vehicle and the air bypass valve. Therefore, the driver can easily hear the air shooting sound upon opening of the air bypass valve. Also, the position of the air bypass valve is heightened, so that it is possible to easily dispose the air bypass valve at a position at which it can be easily seen from an outside. Also, the air bypass valve is disposed at the rear of the air intake piping, so that it is possible to prevent the air bypass valve from being exposed to the front of the sadly riding type vehicle. Therefore, it is possible to prevent a situation where a stone flying from the front collides with the air bypass valve and damages the air bypass valve.

In the saddle-ridden type vehicle, the air bypass valve may be disposed at a position higher than the crank case.

According to the above aspect of the disclosure, the position of the air bypass valve is heightened, so that it is possible to enable the user to easily hear the air shooting sound upon opening of the air bypass valve and it is possible to easily dispose the air bypass valve at a position at which it can be easily seen from an outside.

In the saddle-ridden type vehicle, the air bypass valve may be disposed at one side in the vehicle width direction relative to one side surface of the cylinder in the vehicle width direction.

According to the above aspect of the disclosure, the air bypass valve is positioned at the outer side in the vehicle width direction of the saddle-ridden type vehicle. As a result, since the engine is not interposed between the head of the driver sitting on the seat of the saddle-ridden type vehicle and the air bypass valve, the air shooting sound can easily reach the ears of the driver upon the opening of the air bypass valve. Also, the air bypass valve can be easily seen from the outside.

In the saddle-ridden type vehicle, the air bypass valve may be disposed at a position overlapping with the cylinder, as seen in a side view of the saddle-ridden type vehicle.

According to the above aspect of the disclosure, the position of the air bypass valve is heightened, so that it is possible to enable the user to easily hear the air shooting sound upon opening of the air bypass valve and it is possible to easily dispose the air bypass valve at a position at which it can be easily seen from an outside.

In the saddle-ridden type vehicle, the air outlet piping may be positioned between the air bypass valve and the supercharger.

According to the above aspect of the disclosure, the air outlet piping is interposed between the air bypass valve and the supercharger, so that the heat of the supercharger is difficult to be transferred to the air bypass valve. Therefore, it is possible to protect the air bypass valve from the heat of the supercharger.

In the saddle-ridden type vehicle, the intercooler may be disposed above the engine, the air outlet piping may be disposed at other side relative to the air intake piping and extend in the substantially same direction as the air intake piping in the region ranging from the above of the engine to the front of the engine at the one side in the vehicle width direction, and the air bypass passage may be formed by a piping configured to interconnect the air intake piping and the air outlet piping.

According to the above aspect of the disclosure, the air intake piping and the air outlet piping extend in the substantially same direction in the same region, so that both pipings are close to each other. Therefore, it is possible to form the air bypass passage configured to interconnect the air outlet piping and the air intake piping by a short piping. Thus, it is possible to smoothly flow the air upon the opening of the air bypass valve.

According to a second aspect of the embodiments of the present invention, there is provided a saddle-ridden type vehicle comprising: a vehicle body frame having a head pipe and a pair of frame members each of which is connected to the head pipe and extends rearward from the head pipe with expanding toward one side and the other side in a vehicle width direction, respectively; an engine supported between the pair of frame members; an air cleaner configured to purify air for fuel combustion; a supercharger configured to compress the air purified by the air cleaner; an intercooler configured to cool the air compressed by the supercharger and to supply the air to the engine; an air intake piping connected between the air cleaner and the supercharger and configured to supply the air purified by the air cleaner to the supercharger; and an air outlet piping connected between the supercharger and the intercooler and configured to supply the air compressed by the supercharger to the intercooler, wherein the supercharger is disposed in front of the engine, wherein the air cleaner and the intercooler are disposed above the engine and the supercharger, and wherein both the air intake piping and the air outlet piping extend in an upper-lower direction in a region ranging from the above of the engine to the front of the engine at one side in the vehicle width direction.

According to the above aspect of the disclosure, both the air intake piping and the air outlet piping pass through the region ranging from the above of the engine to the front thereof without traversing laterally the engine. Thereby, it is possible to make an outward appearance of the engine better, as seen in a side view, thereby improving a design property of the saddle-ridden type vehicle. Also, since the side of the engine opens, the traveling wind can easily collide with the engine from the side, so that it is possible to increase the cooling performance of the engine and it is possible to easily secure a space for arranging components at the side of the engine. Further, it is possible to reduce a vehicle width, thereby improving a handling property of the saddle-ridden type vehicle. Also, since the air intake piping and the air outlet piping are disposed at one side in the vehicle width direction in the region ranging from the above of the engine to the front thereof, it is possible to secure a space for arranging other components at the other side in the vehicle width direction in the region ranging from the above of the engine to the front thereof. As a result, it is possible to dispose the components such as an electric fan of a radiator, a cooling water piping for engine cooling and the like at the other side in the vehicle width direction in the region ranging from the above of the engine to the front thereof.

In the saddle-ridden type vehicle, wherein the air intake piping and the air outlet piping may be piped with one of the pair of frame members at one side in the vehicle width direction being interposed between the air intake piping and the air outlet piping.

According to the above aspect of the disclosure, it is possible to easily pipe both the air intake piping and the air outlet piping in the region ranging from the above of the engine to the front thereof at one side in the vehicle width direction. That is, when one of the air intake piping and the air outlet piping is disposed between the frame members, it is possible to secure a margin as to a layout of the pipings, as compared to a case where both the air intake piping and the air outlet piping are disposed at an outer side between the frame members or both the air intake piping and the air outlet piping are disposed between the frame members. In addition, it is possible to linearly pipe the air intake piping and the air outlet piping without largely bending the same.

In the saddle-ridden type vehicle, the air outlet piping may pass between the pair of frame members and the air intake piping may pass an outer side between the pair of frame members.

According to the above aspect of the disclosure, it is possible to easily pipe both the air intake piping and the air outlet piping in the region ranging from the above of the engine to the front thereof at one side in the vehicle width direction.

In the saddle-ridden type vehicle, the air cleaner and the intercooler may be arranged side by side in the vehicle width direction.

According to the above aspect of the disclosure, it is possible to bring both the air cleaner and the intercooler close to the upper-front region of the engine or to position parts of the air cleaner and the intercooler in the upper-front region of the engine. Thereby, it is possible to easily pipe both the air intake piping and the air outlet piping in the region ranging from the above of the engine to the front thereof.

In the saddle-ridden type vehicle, the supercharger may comprise a turbine unit having a turbine configured to drive by an exhaust gas of the engine and a compressor unit configured to drive by power of the turbine and to compress the air, and the supercharger may be disposed so that the compressor unit is positioned at one side in the vehicle width direction relative to the turbine unit.

According to the above aspect of the disclosure, the air intake piping and the air outlet piping are respectively connected to the intake-side and discharge-side of the compressor unit of the supercharger. Since the supercharger is disposed so that the compressor unit is positioned at one side in the vehicle width direction relative to the turbine unit, it is possible to easily dispose the air intake piping and the air outlet piping in the region ranging from the above of the engine to the front thereof at one side in the vehicle width direction.

In the saddle-ridden type vehicle, the air intake piping and the air outlet piping may be piped along one of the pair of frame members at one side in the vehicle width direction.

According to the above aspect of the disclosure, it is possible to easily dispose the air intake piping and the air outlet piping in the region ranging from the above of the engine to the front thereof at one side in the vehicle width direction.

According to a third aspect of the embodiments of the present invention, there is provided a saddle-ridden type vehicle comprising: an engine having a crank case, a cylinder and a cylinder head provided above the crank case, and a cylinder head cover provided above the cylinder head; a radiator provided in front of the engine and configured to cool cooling water for cooling the engine by traveling wind; an air cleaner configured to purify air for fuel combustion; a supercharger configured to compress the air purified by the air cleaner; an intercooler configured to cool the air compressed by the supercharger and to supply the air to the engine; an air intake piping connected between the air cleaner and the supercharger and configured to supply the air purified by the air cleaner to the supercharger; and an air outlet piping connected between the supercharger and the intercooler and configured to supply the air compressed by the supercharger to the intercooler, wherein the supercharger is disposed between the engine and the radiator, wherein the air cleaner and the intercooler are disposed above the engine and the supercharger, and wherein both the air intake piping and the air outlet piping extend in an upper-lower direction between the engine and the radiator.

According to the above aspect of the disclosure, both the air intake piping and the air outlet piping pass between the engine and the radiator and do not traverse laterally the engine. Thereby, it is possible to make an outward appearance of the engine better, as seen in a side view, thereby improving a design property of the saddle-ridden type vehicle. Also, since the side of the engine opens, the traveling wind can easily collide with the engine from the side, so that it is possible to increase the cooling performance of the engine and it is possible to easily secure a space for arranging components at the side of the engine. Further, it is possible to reduce a vehicle width, thereby improving a handling property of the saddle-ridden type vehicle.

In the saddle-ridden type vehicle, the air cleaner and the intercooler may be arranged side by side in a vehicle width direction.

According to the above aspect of the disclosure, it is possible to bring both the air cleaner and the intercooler close to a region between the engine and the radiator. Thereby, it is possible to arrange both the air intake piping and the air outlet piping between the engine and the radiator.

In the saddle-ridden type vehicle, the air intake piping and the air outlet piping may be arranged at one side in a vehicle width direction.

According to the above aspect of the disclosure, it is possible to secure a space for disposing the other components at the other side in the vehicle width direction in the region between the engine and the radiator. As a result, it is possible to dispose the components such as an electric fan of the radiator, cooling water piping for engine cooling and the like at the other side in the vehicle width direction in the region between the engine and the radiator.

In the saddle-ridden type vehicle, the supercharger may comprise a turbine unit having a turbine configured to drive by an exhaust gas of the engine and a compressor unit configured to drive by power of the turbine and to compress the air, and the supercharger may be disposed so that the compressor unit is positioned at one side in a vehicle width direction relative to the turbine unit.

According to the above aspect of the disclosure, the air intake piping and the air outlet piping are respectively connected to the intake-side and discharge-side of the compressor unit of the supercharger. Since the supercharger is disposed so that the compressor unit is positioned at one side in the vehicle width direction relative to the turbine unit, it is possible to easily dispose the air intake piping and the air outlet piping in the region between the engine and the radiator at one side in the vehicle width direction.

In the saddle-ridden type vehicle, the air cleaner may have an outlet to which an end portion of the air intake piping is connected and which is configured to enable the purified air to flow to the air inlet piping, the intercooler may have an inlet to which an end portion of the air outlet piping is connected and which is configured to enable the air from the air outlet piping to flow into the intercooler, and positions of the outlet of the air cleaner and the inlet of the intercooler in a front-rear direction of the saddle-ridden type vehicle may be the same as a position of a front end portion of the cylinder head cover or are located in front of the position of the front end portion of the cylinder head cover.

According to the above aspect of the disclosure, since the outlet of the air cleaner and the inlet of the intercooler are close to the region between the engine and the radiator (are positioned above the region), it is possible to easily arrange the air intake piping and the air outlet piping between the engine and the radiator.

In the saddle-ridden type vehicle, the supercharger may be disposed in front of the cylinder.

According to the above aspect of the disclosure, since the supercharger is disposed in front of the cylinder disposed above the crank case of the engine, the supercharger is located at a position close to the upper of the engine. As a result, since a distance between the supercharger and both the air cleaner and intercooler disposed above the engine is reduced, it is possible to shorten both the air intake piping and the air outlet piping. Therefore, it is possible to reduce a resistance against the air flowing through the intake pipings, so that it is possible to increase a response of the engine or to reduce a turbo lag.

According to the disclosure, it is possible to protect the air bypass valve, to express the air bypass valve and to increase charms of the engine having the supercharger.

According to the disclosure, it is possible to improve a design property of the saddle-ridden type vehicle, cooling performance of the engine or and a handling property of the saddle-ridden type vehicle and to easily secure an arrangement space for the components to be provided in the engine.

DETAILED DESCRIPTION OF THE EMBODIMENTS

[First Illustrative Embodiment]

Hereinafter, a first illustrative embodiment according to the disclosure will be described with reference to FIGS. 1 to 11.

(Motorcycle Having Supercharger)

Figure 1:
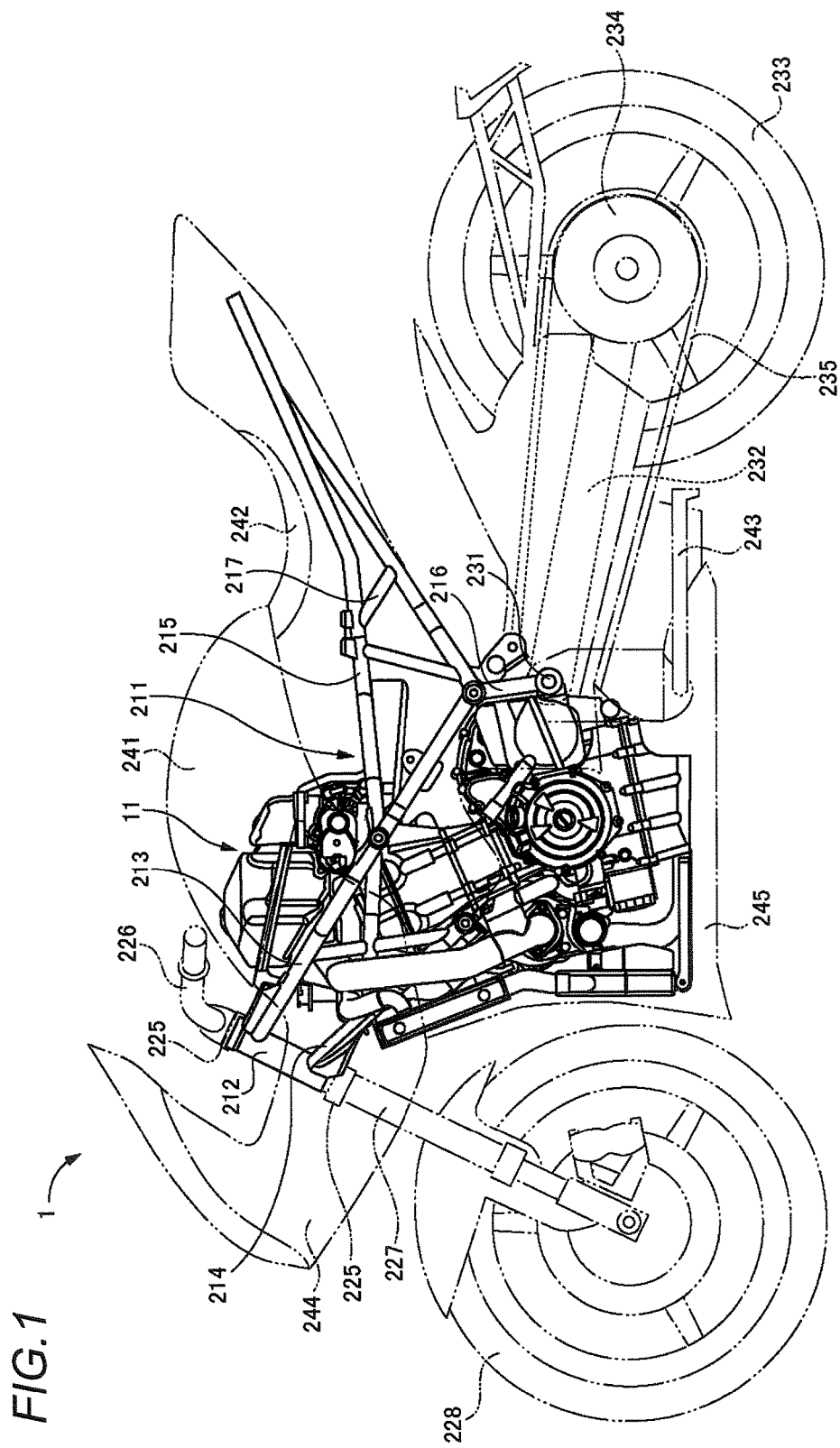
FIG. 1 illustrates a motorcycle having a supercharger, which is a first illustrative embodiment of the saddle-ridden type vehicle of the disclosure.
Figure 2:
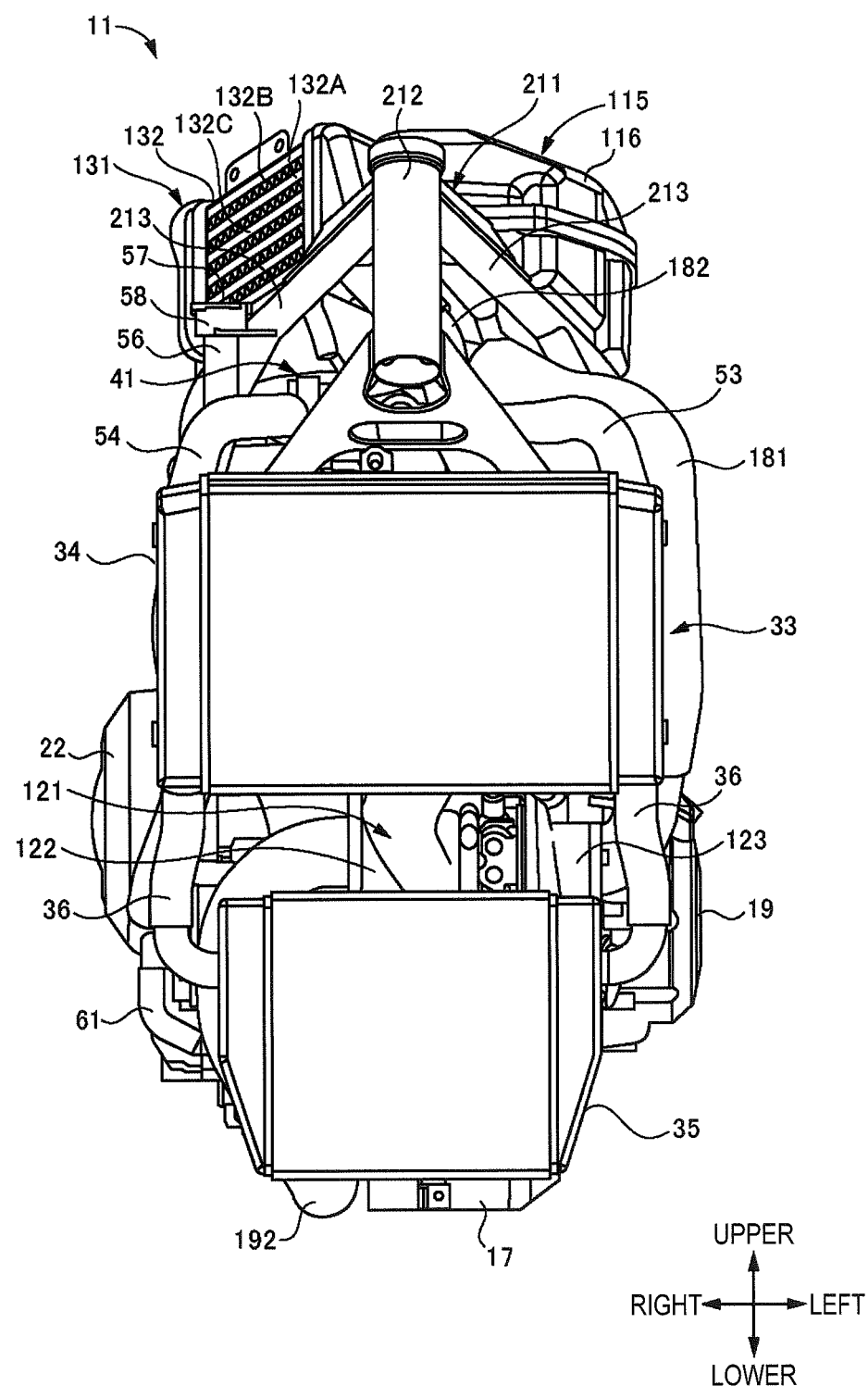
FIG. 2 is a front view of a vehicle body frame and an engine unit of the motorcycle having a supercharger, which is the first illustrative embodiment of the saddle-ridden type vehicle of the disclosure.

FIG. 1 illustrates a motorcycle having a supercharger, which is a first illustrative embodiment of the saddle-ridden type vehicle of the disclosure. In FIG. 1, parts except for a vehicle body frame 211 and an engine unit 11 of the motorcycle having the supercharger are shown with a dashed-two dotted line for convenience of explanations. Also, FIGS. 2 to 5 are a front view, a left side view, a right side view and a plan view of the vehicle body frame 211 and the engine unit 11, and FIG. 6 is a front view depicting a state where a radiator 33 has been removed from the engine unit 11. Also, in below descriptions of the first illustrative embodiment, front, rear, right, left, upper and lower directions are described on the basis of a driver who sits on a seat of the motorcycle having the supercharger.

In FIG. 1, a vehicle body frame 211 of a motorcycle 1 having a supercharger, which is the first illustrative embodiment of the saddle-ridden type vehicle of the disclosure, is formed by joining a plurality of steel pipes, for example. Specifically, the vehicle body frame 211 has a head pipe 212 disposed at a front-upper side of the motorcycle 1, a pair of main frames 213 each of which is disposed at right and left sides of the motorcycle 1, respectively, and has a front end portion connected to an upper part of the head pipe 212 and a rear end-side extending rearward with being inclined downward, a pair of down tubes 214 each of which is disposed at the right and left sides of the motorcycle 1, respectively, and has a front end portion connected to a lower part of the head pipe 212 and a rear end-side extending rearward with being inclined downward relative to the main frame 213, a pair of side frames 215 each of which is disposed at the right and left sides of the motorcycle 1, respectively, and has a front end portion connected to an intermediate part of the down tube 214 and a rear end-side extending rearward, and a pair of pivot frames 216 joined to the rear end-sides of the main frames 213. Also, a reinforcement frame 217 is provided among the main frame 213, the down tube 214 and the side frame 215.

Figure 3:
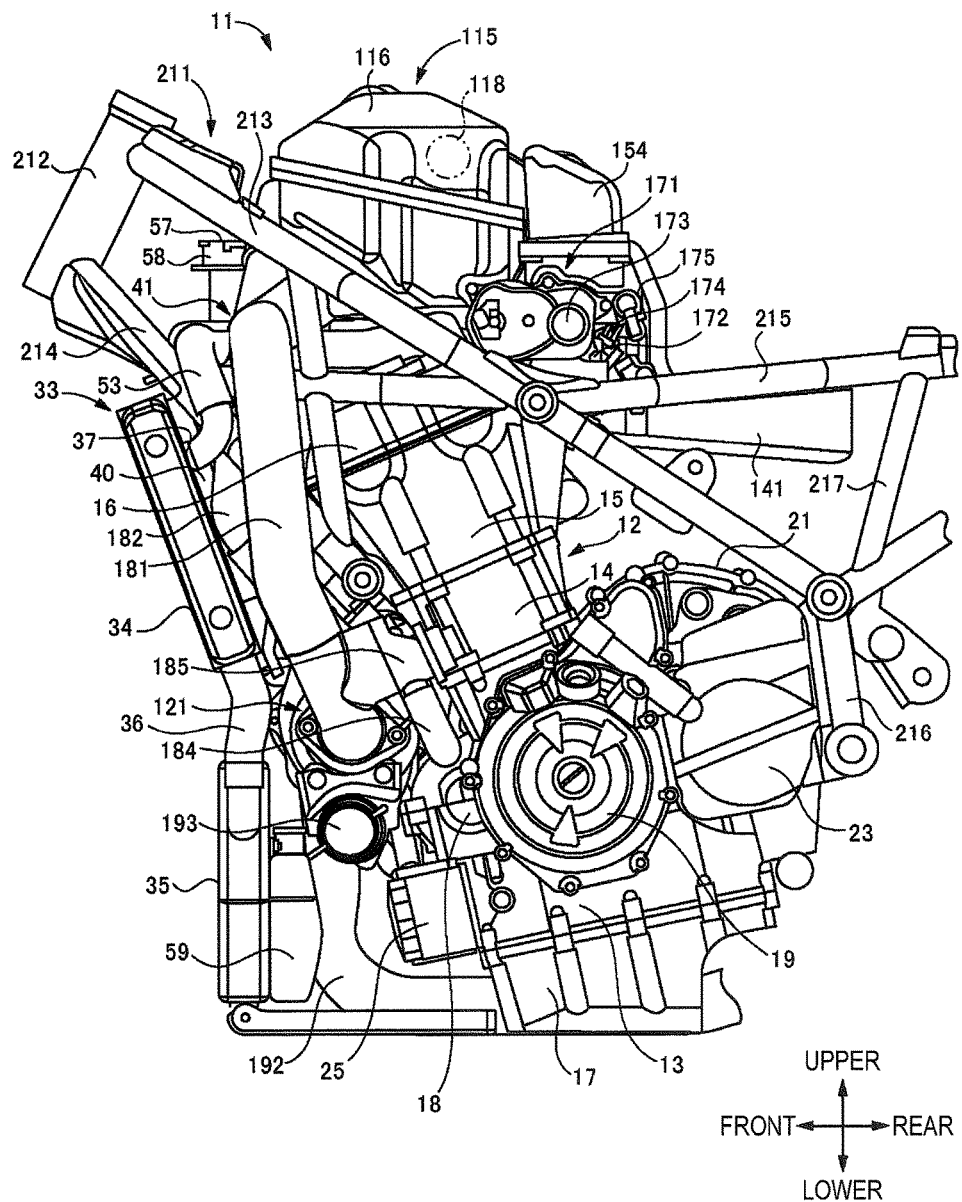
FIG. 3 is a left side view of the vehicle body frame and the engine unit shown in FIG. 2.
Figure 5:
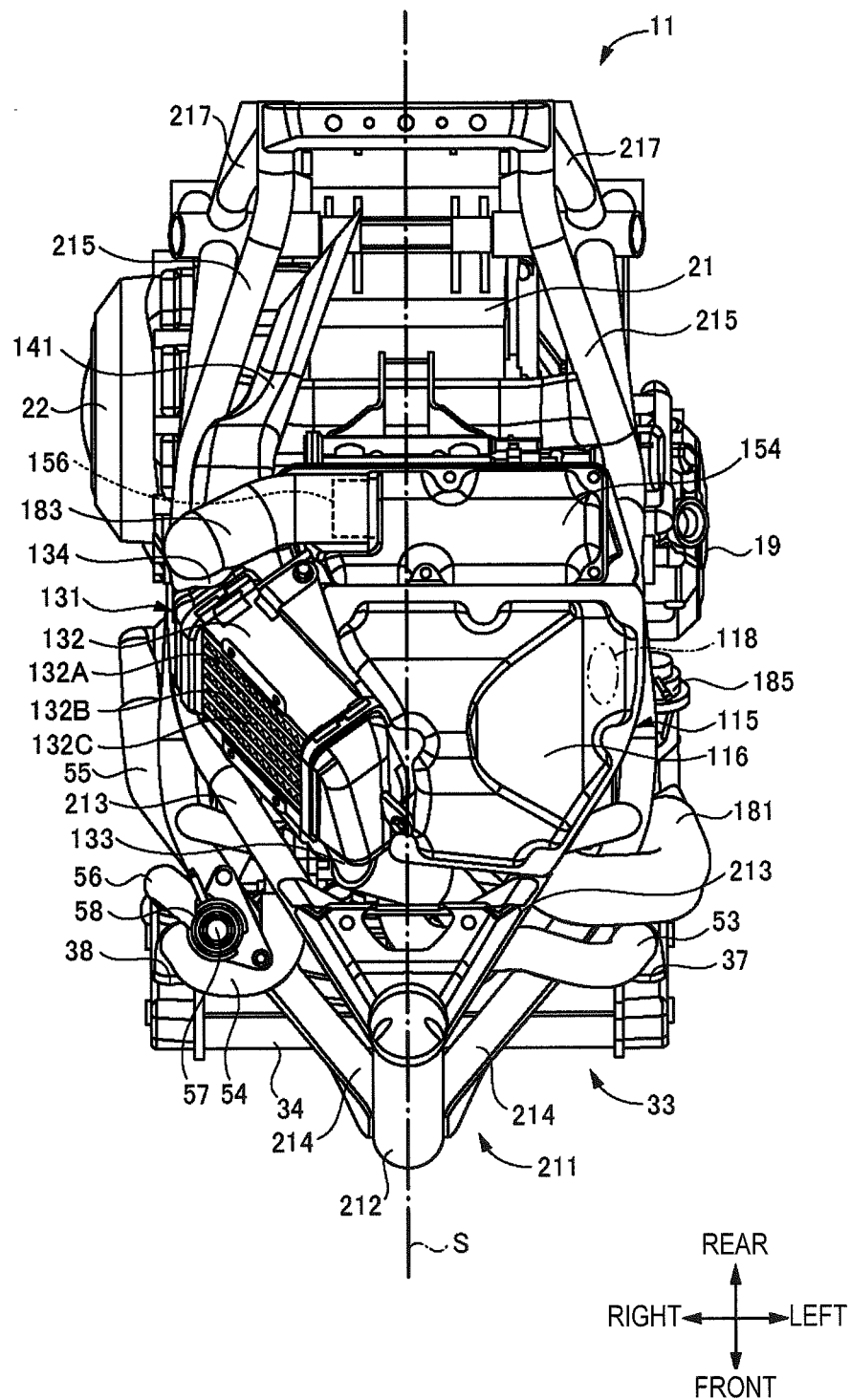
FIG. 5 is a plan view of the vehicle body frame and the engine unit shown in FIG. 2.
Figure 6:
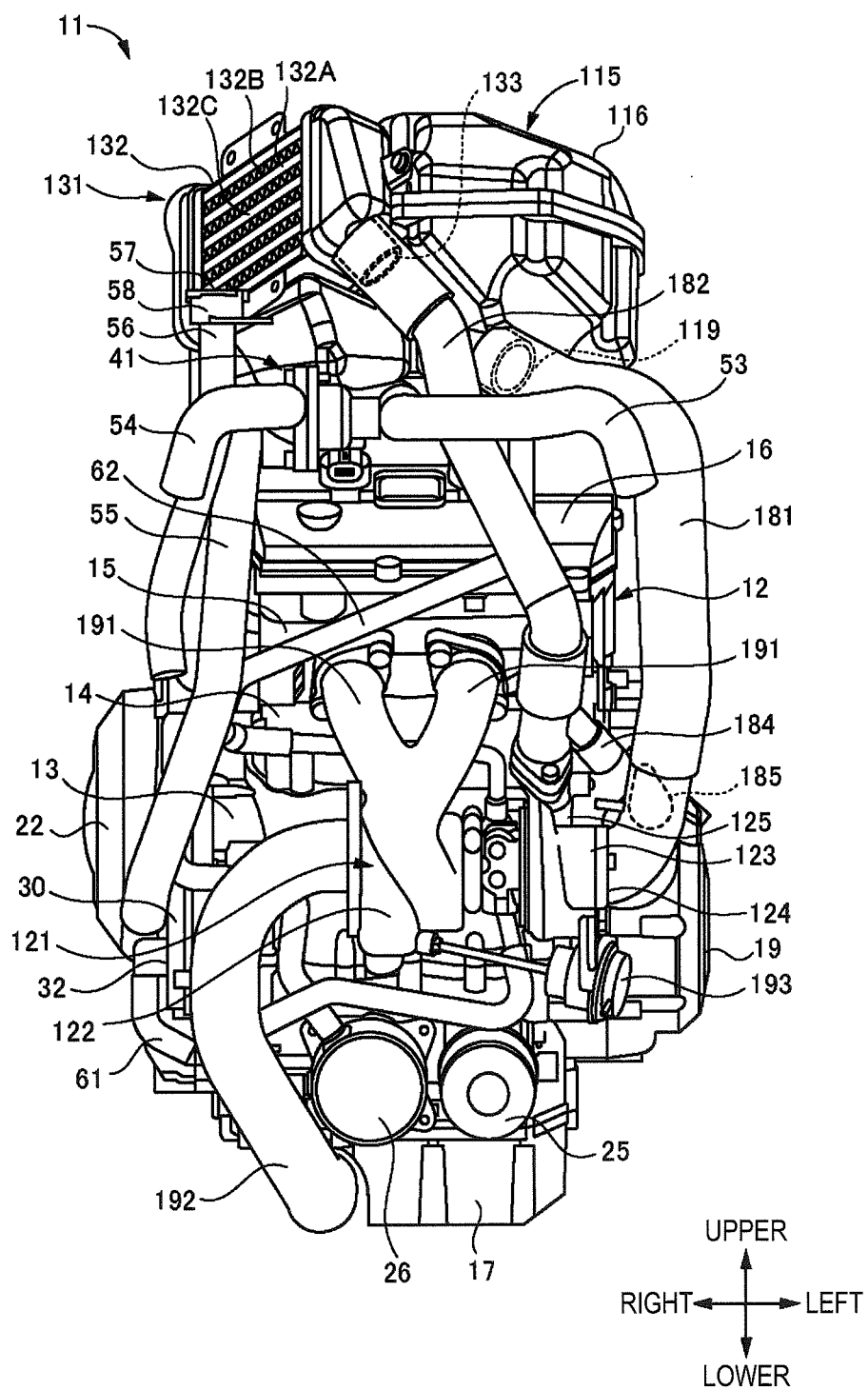
FIG. 6 is a front view depicting a state where a radiator has been removed from the engine unit shown in FIG. 2.

Also, as shown in FIG. 5, the pair of main frames 213 extends rearward from the head pipe 212 with expanding leftward and rightward, respectively. That is, when a line passing a center of the motorcycle 1 in a right-left direction (vehicle width direction) of the motorcycle 1 in a front-rear direction of the motorcycle 1 is denoted as a reference line S, a front end portion of the right main frame 213 obliquely extends toward a right-rear side from the head pipe 212 disposed at a center of the motorcycle 1 in the right-left direction of the motorcycle 1. Then, the right main frame 213 is gently bent in the vicinity of a rear-right side of a cylinder head 15 of an engine 12 and extends rearward in parallel with the reference line S. Then, the right main frame 213 is slightly bent at a part beyond a rear surface of the cylinder head 15, and extends rearward with being slightly inclined leftward so as to gradually come close to the reference line S. In the meantime, the left main frame 213 has a substantially bilaterally symmetric shape to the right main frame 213 with respect to the reference line S. Also, the pair of down tubes 214 extends rearward from the head pipe 212 with expanding leftward and rightward, respectively, like the pair of main frames 213. Also, as shown in FIG. 3, the pair of down tubes 214 is positioned below the pair of main frames 213, a space is formed between the left main frame 213 and the left down tube 214, and a space is formed between the right main frame 213 and the right down tube 214.

Also, as shown in FIG. 1, a steering shaft (not shown) is inserted into the head pipe 212, and upper and lower end portions of the steering shaft are respectively provided with steering brackets 225. Also, the upper steering bracket 225 is provided with a handlebar 226. A pair of right and left front forks 227 is supported at upper parts thereof to the upper and lower steering brackets 225, and a front wheel 228 is supported to lower ends of the front forks 227.

Also, a front end-side of a swing arm 232 is supported between the pair of right and left pivot frames 216 via a pivot shaft 231, and a rear wheel 233 is supported to a rear end-side of the swing arm 232. Also, an axle of the rear wheel 233 is provided with a driven sprocket 234, and a chain 235 configured to transmit power of the engine 12 (which will be described later) is wound on the driven sprocket 234.

Also, the engine unit 11 is provided between the front wheel 228 and the rear wheel 233 of the motorcycle 1. The engine unit 11 is mainly disposed between the left main frame 213 and left down tube 214 and the right main frame 213 and right down tube 214 and is supported to the corresponding frames. Also, a fuel tank 241 is provided above the engine unit 11, and a seat 242 is provided at the rear of the fuel tank 241. Also, a side stand 243 is provided at the left side of the motorcycle 1 and at a lower-rear part of the engine unit 11. Also, an upper cowl 244 is provided at a front-upper side of the motorcycle 1. Also, the motorcycle 1 is provided with an under cowl 245 configured to mainly cover a front-lower side of the engine unit 11.

(Engine Unit)

As shown in FIG. 3, the engine unit 11 has the engine 12, parts of a driving system configured to transmit power of the engine 12 to the rear wheel 233, such as a primary deceleration mechanism, a clutch, a transmission and the like, a lubrication system configured to lubricate a moveable part of the engine 12, an intake system (including a supercharger 121) configured to supply a fuel-air mixture of air and fuel to the engine 12, parts of an exhaust system configured to discharge an exhaust gas, which is to be generated as the fuel-air mixture is combusted, from the engine 12, a cooling system configured to cool the engine 12 and the like, an AC generator configured to generate power by using rotation of a crankshaft, and the like.

In the first illustrative embodiment, the engine 12 is a water-cooling type parallel two-cylinder four-cycle gasoline engine, for example. The engine 12 has a crank case 13 configured to accommodate therein a crankshaft, a cylinder 14 provided above the crank case 13, a cylinder head 15 provided above the cylinder 14 and a cylinder head cover 16 provided above the cylinder head 15. Also, an oil pan 17 is provided below the crank case 13. A cylinder axis of the engine 12 is inclined so that an upper side is located at a forward position relative to a lower side. The engine 12 is provided with a balance shaft configured to reduce vibrations, which are to be generated by movement of a piston. The balance shaft is disposed in front of the crankshaft. Specifically, a balancer chamber 18 is integrally formed at a front part of the crank case 13 of the engine 12. The balancer chamber 18 is formed by expanding forward a part of the crank case 13. A front part of the balancer chamber 18 protrudes forward from a front wall part of the crank case 13. The balance shaft is provided in the balancer chamber 18. Also, a left part of the crank case 13 is provided with a magneto chamber 19, and the AC generator is accommodated in the magneto chamber 19.

Figure 4:
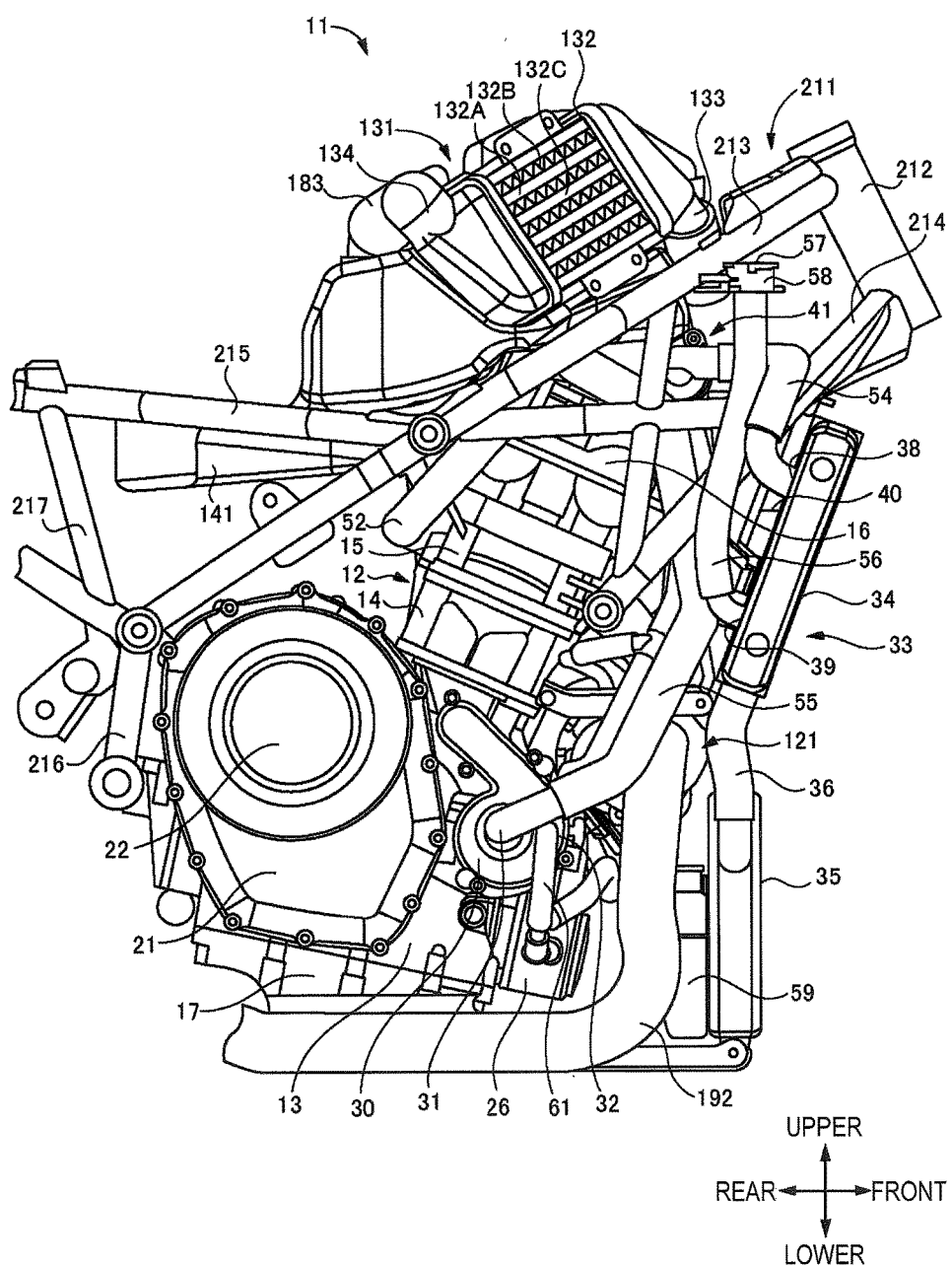
FIG. 4 is a right side view of the vehicle body frame and the engine unit shown in FIG. 2.

Also, as shown in FIG. 4, parts of the driving system such as the primary deceleration mechanism, the clutch, the transmission and the like are disposed at the rear part of the engine unit 11. That is, a transmission case 21 is integrally formed at rear sides of the crank case 13 and the cylinder 14, and the primary deceleration mechanism and the transmission are accommodated in the transmission case 21. Also, a clutch cover 22 is attached to a right part of the transmission case 21, and the clutch disposed at the right of the transmission is covered by the clutch cover 22. Also, as shown in FIG. 3, a sprocket cover 23 is provided at a left part of the transmission case 21, and a drive sprocket disposed at a left side of the transmission is covered by the sprocket cover 23. Also, the drive sprocket is wound with a chain 235 configured to transmit the power of the engine 12 to the rear wheel 233, as shown in FIG. 1.

Also, as shown in FIG. 6, the lubrication system has an oil pump configured to pump engine oil stored in the oil pan 17 of the engine 12 and to supply the same to the respective parts of the engine 12, an oil filter 25 configured to filter the engine oil and a water-cooling type oil cooler 26 configured to cool the engine oil. The oil filter 25 and the oil cooler 26 are attached to a front-lower side of the engine 12.

Also, as shown in FIG. 4, the cooling system has a water pump 30, a water jacket (not shown), a radiator 33 and a cooling water flow control unit 41.

The water pump 30 is a device configured to operate by using the rotation of the crankshaft and to discharge the cooling water to the water jacket. The water pump 30 is disposed in front of the crankshaft at the right of the crank case 13.

The water jacket is a mechanism provided in the cylinder 14 and the cylinder head 15 and configured to cool the cylinder 14 and the cylinder head 15 by the cooling water. A path for supplying the cooling water from the water pump 30 to the water jacket is formed between the water pump 30 and the water jacket.

The radiator 33 is a device configured to receive traveling wind or to drive a radiator fan 40, thereby radiating heat of the cooling water to the atmosphere to cool the cooling water. The radiator 33 is disposed at the front of the engine 12. Also, the radiator 33 has an upper radiator 34 and a lower radiator 35. The upper radiator 34 and the lower radiator 35 are interconnected via a pair of connecting hoses 36. Also, the radiator fan 40 is attached at a position toward the right of a rear surface of the upper radiator 34 (refer to FIG. 7).

Figure 7:
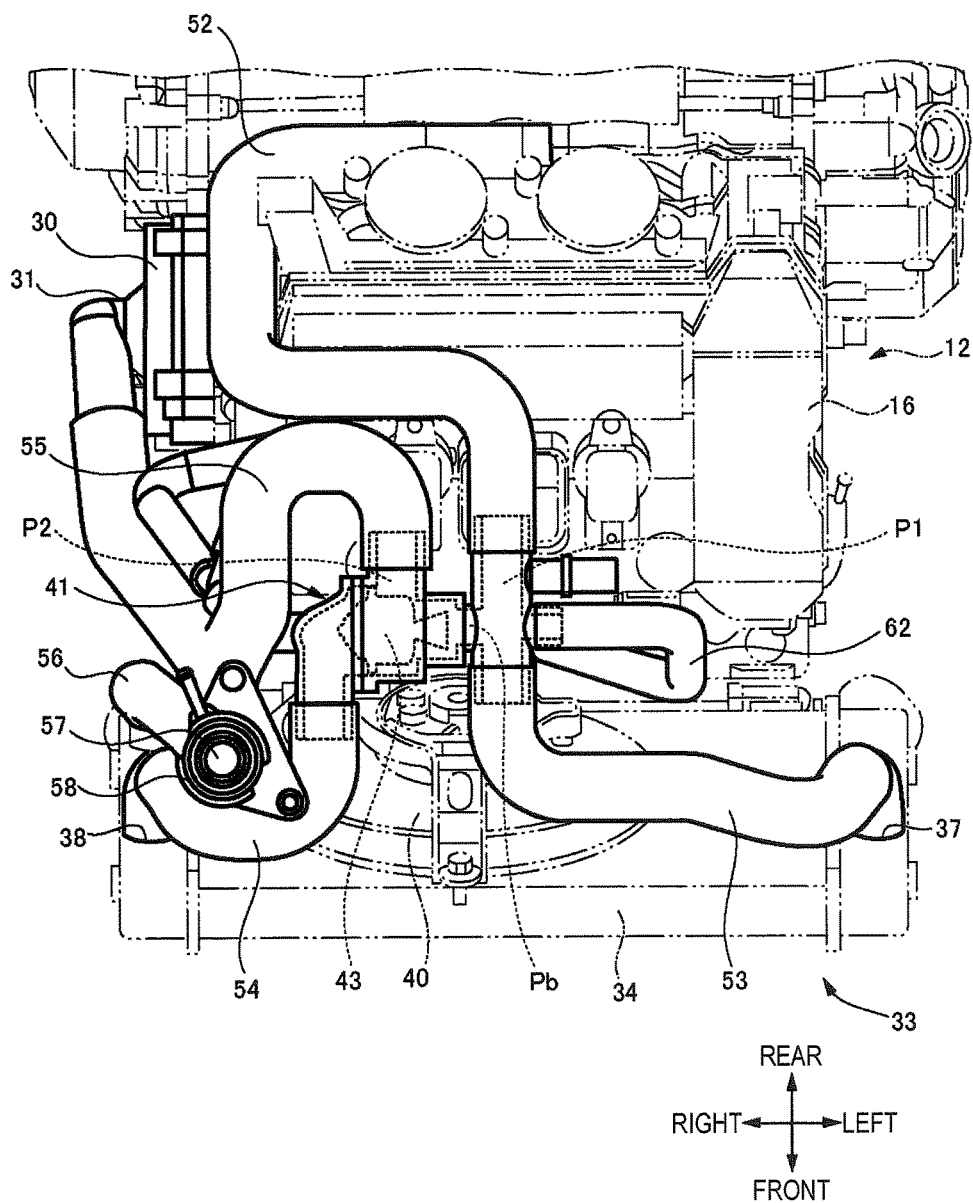
FIG. 7 illustrates a cooling water flow control unit, a cylinder outlet hose, a radiator inlet hose, a radiator outlet hose, a water pump inlet hose and the like of the motorcycle having a supercharger, which is the first illustrative embodiment of the saddle-ridden type vehicle of the disclosure.

The cooling water flow control unit 41 is a device configured to regulate an amount of the cooling water to flow in the radiator 33 in accordance with a temperature of the cooling water and to maintain the temperature of the cooling water to an appropriate temperature. FIG. 7 is a plan view of a front part of the engine unit 11 from which the air cleaner 115, the intercooler 131, the surge tank 154 and the like have been omitted. In FIG. 7, the engine 12, the radiator 33 and the like are shown with the dashed-two dotted line so as to prominently express the cooling water flow control unit 41, a cylinder outlet hose 52, a radiator inlet hose 53, a radiator outlet hose 54, a water pump inlet hose 55 and the like. As shown in FIG. 7, the cooling water flow control unit 41 is disposed at a right-front side above the cylinder head cover 16.

A left part of the cooling water flow control unit 41 is formed therein with a passage P1 for supplying the cooling water from the water jacket to the radiator 33. A cylinder outlet hose 52 is connected between an inlet-side of the passage P1 and an outlet-side of the water jacket, and a radiator inlet hose 53 is connected between an outlet-side of the passage P1 and a radiator inlet 37 of the radiator 33.

Also, a right part of the cooling water flow control unit 41 is formed therein with a passage P2 for returning the cooling water from the radiator 33 to the water pump 30. A radiator outlet hose 54 is connected between a radiator outlet 38 of the radiator 33 and an inlet-side of the passage P2, and a water pump inlet hose 55 is connected between an outlet-side of the passage P2 and a cooling water intake port 31 of the water pump 30.

Also, the cooling water flow control unit 41 is formed therein with a cooling water bypass passage Pb configured to connect the passage P1 and the passage P2.

Further, the cooling water flow control unit 41 is provided therein with a thermostat 43. The thermostat 43 is configured to regulate an amount of the cooling water to flow in the radiator 33 in accordance with the temperature of the cooling water. That is, when the temperature of the cooling water is equal to or lower than a predetermined reference temperature T1, the thermostat 43 controls flow of the cooling water so that the cooling water flows in a first circulation path formed by the water pump 30, the water jacket, the cylinder outlet hose 52, the passage P1, the cooling water bypass passage Pb, the passage P2 and the water pump inlet hose 55, and disables the cooling water from circulating in the radiator 33. On the other hand, when the temperature of the cooling water is higher than a predetermined reference temperature T2 (T2>T1), the thermostat 43 controls flow of the cooling water so that the cooling water flows in a second circulation path formed by the water pump 30, the water jacket, the cylinder outlet hose 52, the passage P1, the radiator inlet hose 53, the radiator 33, the radiator outlet hose 54, the passage P2 and the water pump inlet hose 55, and enables the cooling water to flow in the radiator 33. On the other hand, when the temperature of the cooling water is higher than the reference temperature T1 and is equal to or lower than the reference temperature T2, the thermostat 43 controls flow of the cooling water so that the cooling water flows in both the first circulation path and the second circulation path, and enables a part of the cooling water to flow in the radiator 33.

Also, as shown in FIG. 4, a right-lower side of the rear surface of the upper radiator 34 is formed with a cooling water supply port 39, the cooling water supply port 39 is connected with a lower end portion of a water injection hose 56 extending in the upper-lower direction, and an upper end portion of the water injection hose 56 is provided with a cooling water injection part 58 having a cooling water injection port 57. Also, a reservoir tank 59 configured to reserve therein the cooling water is provided at the rear of the lower radiator 35, and the reservoir tank 59 is connected to the upper radiator 34 via an overflow pipe line (not shown), for example.

Also, the cooling system of the engine unit 11 has a configuration of supplying the cooling water to the oil cooler 26 and the supercharger 121 so as to cool the engine oil and the supercharger 121. Specifically, the water pump 30 has a cooling water discharge port 32 and is configured to supply the cooling water to the water jacket and to discharge the cooling water from the cooling water discharge port 32. The cooling water discharged from the cooling water discharge port 32 is supplied to the oil cooler 26 and the supercharger 121 via an inlet branch piping 61 disposed in front of the engine 12. Also, as shown in FIG. 6 or 7, the cooling water having cooled the engine oil and the supercharger 121 flows in an outlet branch piping 62 disposed in front of the engine 12 and flows into the passage P1 of the cooling water flow control unit 41.

(Structures of Intake System and Exhaust System)

Also, as shown in FIG. 3 or 6, the intake system has an air cleaner 115, a supercharger 121, an intercooler 131, an air discharging duct 141, a surge tank 154, an electronic control throttle device 171 and an injector 174.

The air cleaner 115 is a device configured to filter and purify air for fuel combustion introduced from an outside. The air cleaner 115 has a cleaner case 116 and an air filter is provided in the cleaner case 116. Also, the cleaner case 116 is formed with an air intake port 118 configured to introduce the exterior air into the cleaner case 116. Meanwhile, in FIG. 3 or 5, the air intake port 118 is pictorially shown with a dashed-two dotted line. A position of the air intake port 118 can be appropriately set. Also, the air intake port 118 is provided with an air duct (not shown) configured to guide the exterior air into the air intake port 118. Also, as shown in FIG. 6, a front part of the air cleaner 115 is formed with an air outlet 119 for enabling the filtered air to flow from the cleaner case 116.

The supercharger 121 is a supercharger of an exhaust turbine type, and has a turbine unit 122 having a turbine, and a compressor unit 123. The supercharger 121 is configured to drive the turbine of the turbine unit 122 by the exhaust gas from the engine 12, to drive the compressor unit 123 by power of the turbine and to compress the air supplied through the air cleaner 115 by the compressor unit 123. Also, the compressor unit 123 has an air intake port 124 for introducing the air supplied via the air cleaner 115 into the compressor unit 123 and an air discharge port 125 for discharging the compressed air from the compressor unit 123 and supplying the same to the intercooler 131. By adopting the supercharger 121, it is possible to increase the thermal efficiency and output of the engine 12, to reduce a displacement of the engine 12 and to make the engine small, as compared to the natural intake.

The intercooler 131 is a heat exchanger configured to cool the air of which temperature has increased resulting from the compression by the compressor unit 123 of the supercharger 121. The intercooler 131 is an air-cooling type, and has a passage 132A for flowing the air compressed by the compressor unit 123 and a heat radiation part 132 having fins 132B configured to receive the exterior air and to radiate the heat of the air compressed by the compressor unit 123, as shown in FIG. 6. Also, the heat radiation part 132 has a receiving surface 132C configured to receive the exterior air for heat radiation. Also, a front part of the intercooler 131 is formed with an air inlet 133 for introducing the air supplied from the compressor unit 123 of the supercharger 121 into the passage 132A of the heat radiation part 132. Also, as shown in FIG. 4 or 5, a rear part of the intercooler 131 is formed with an air outlet 134 for supplying the air to the surge tank 154, which has flowed in the passage 132A of the heat radiation part 132 and has been thus cooled.

Also, an air guide duct (not shown) configured to guide the exterior air to the heat radiation part 132 of the intercooler 131 as a cooling air is provided in front of the intercooler 131. Also, as shown in FIG. 5, the air discharging duct 141 configured to discharge the exterior air, which has been guided by the air guide duct, has collided with the heat radiation part 132 of the intercooler 131 and has passed between the fins 132B of the heat radiation part 132, to the outside is provided at the rear of the intercooler 131.

The surge tank 154 is a device configured to rectify the flow of the air compressed by the supercharger 121 and cooled by the intercooler 131. The surge tank 154 has a space for temporarily storing the air cooled by the intercooler 131. Also, in the first illustrative embodiment, the surge tank 154 is formed integrally with the cleaner case 116 of the air cleaner 115. Also, as shown in FIG. 5, an upper-right side of the surge tank 154 is formed with an air inlet 156 for introducing the air supplied from the intercooler 131 into the surge tank 154. Also, a lower part of the surge tank 154 is formed with an air outlet (not shown) for enabling the air temporarily stored in the surge tank 154 to flow to an intake passage formed in a throttle body 172 of the electronic control throttle device 171.

The electronic control throttle device 171 shown in FIG. 3 is a device configured to regulate an amount of the air, which is to pass through the intercooler 131 and the surge tank 154 and is to be supplied to an intake port of the engine 12. The electronic control throttle device 171 has a throttle body 172, a throttle valve provided in the throttle body 172 and configured to open and close an intake passage formed in the throttle body 172, and an electric driving motor 173 configured to drive the throttle valve.

The injector 174 is a device configured to inject the fuel to the intake port of the engine 12. To the injector 174, a delivery pipe 175 configured to supply the fuel from the fuel tank 241 to the injector 174 is connected.

Also, as shown in FIG. 6, the exhaust system has exhaust pipes 191 configured to interconnect exhaust ports of the engine 12 and the turbine unit 122 of the supercharger 121, a muffler joint pipe 192 configured to connect the turbine unit 122 of the supercharger 121 and a muffler-side, a muffler (not shown), and the like. The exhaust pipes 191 configure a part of the engine unit 11. The exhaust pipes 191 are disposed at the front of the engine 12 and between the exhaust ports and the turbine unit 122 of the supercharger 121. In the first illustrative embodiment, the exhaust pipes 191 are integrally formed with a housing of the turbine unit 122 of the supercharger 121. Specifically, one end-sides of the two exhaust pipes 191 are respectively connected to the two exhaust ports of the parallel two-cylinder engine 12. The other end-sides of the exhaust pipes 191 are coupled to each other to form one. The other end portion of the exhaust pipes 191 integrated into one is integrated with the housing of the turbine unit 122 of the supercharger 121. On the other hand, the exhaust pipe 191 and the housing of the turbine unit 122 may be formed as separate members and both members may be connected. Meanwhile, the muffler joint pipe 192 has one end-side connected to the turbine unit 122 of the supercharger 121 and the other end-side passing a lower-right side of the engine 12 and extending rearward toward the muffler. Also, the muffler is disposed at a rear-lower side of the engine 12. The exhaust gas discharged from the respective exhaust ports is supplied into the housing of the turbine unit 122 of the supercharger 121 via the exhaust pipes 191. By the exhaust gas, the turbine of the turbine unit 122 is rotated. Subsequently, the exhaust gas discharged from the turbine unit 122 is supplied to the muffler via the muffler joint pipe 192 and is discharged from the muffler to the outside.

Also, the turbine unit 122 of the supercharger 121 is provided with a waste gate valve 193. That is, the turbine unit 122 is provided therein with a gate configured to circulate a part of the exhaust gas supplied via the exhaust pipes 191 toward the muffler joint pipe 192 without supplying the same to the turbine. The waste gate valve 193 is configured to regulate an inflow amount of the exhaust gas to the turbine by opening and closing the gate.

(Arrangement and Connection of Respective Units of Intake System)

Figure 8:
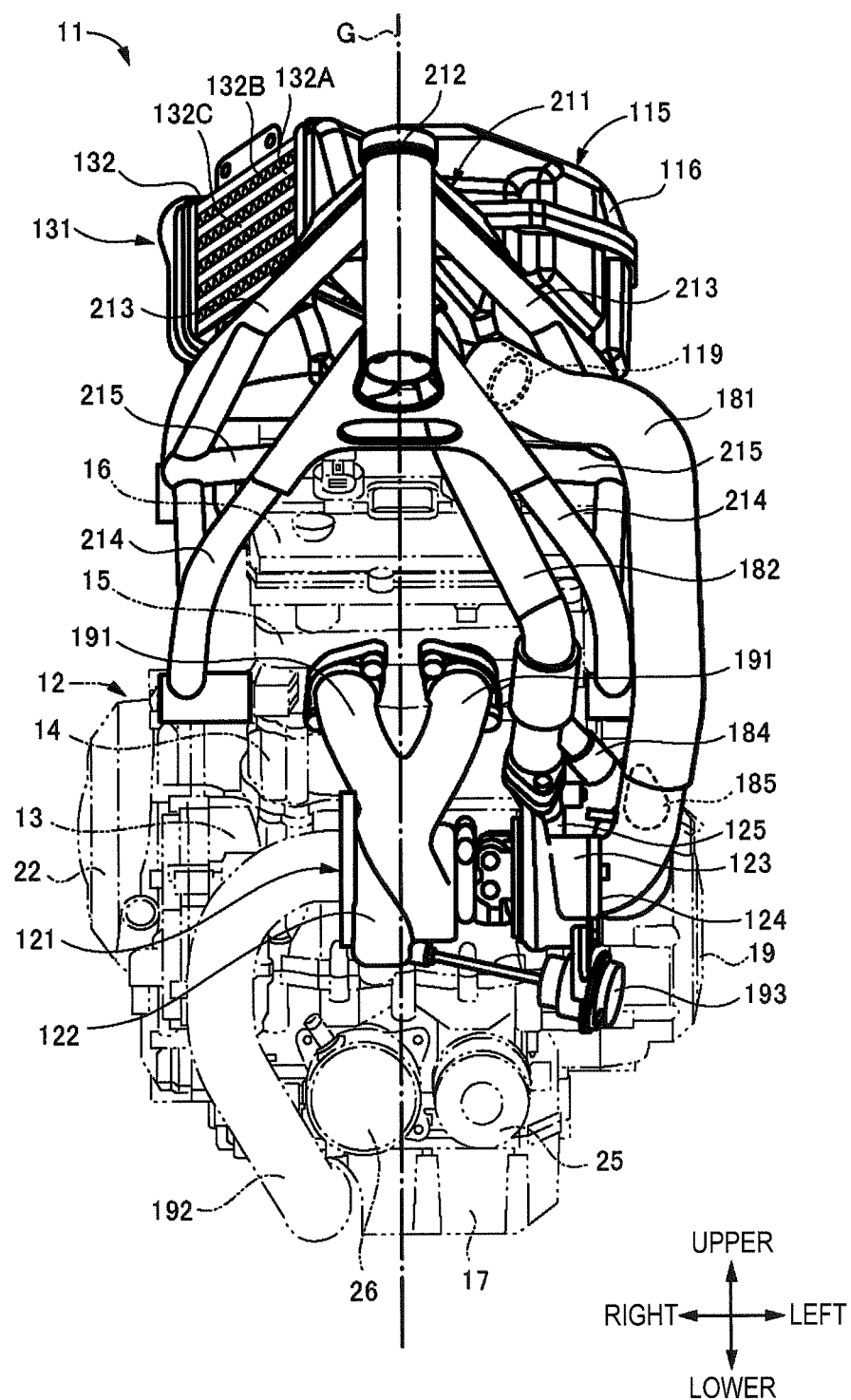
FIG. 8 illustrates arrangement of a vehicle body frame, an air intake pipe, an air outlet pipe and the like of the motorcycle having a supercharger, which is the first illustrative embodiment of the saddle-ridden type vehicle of the disclosure.
Figure 9:
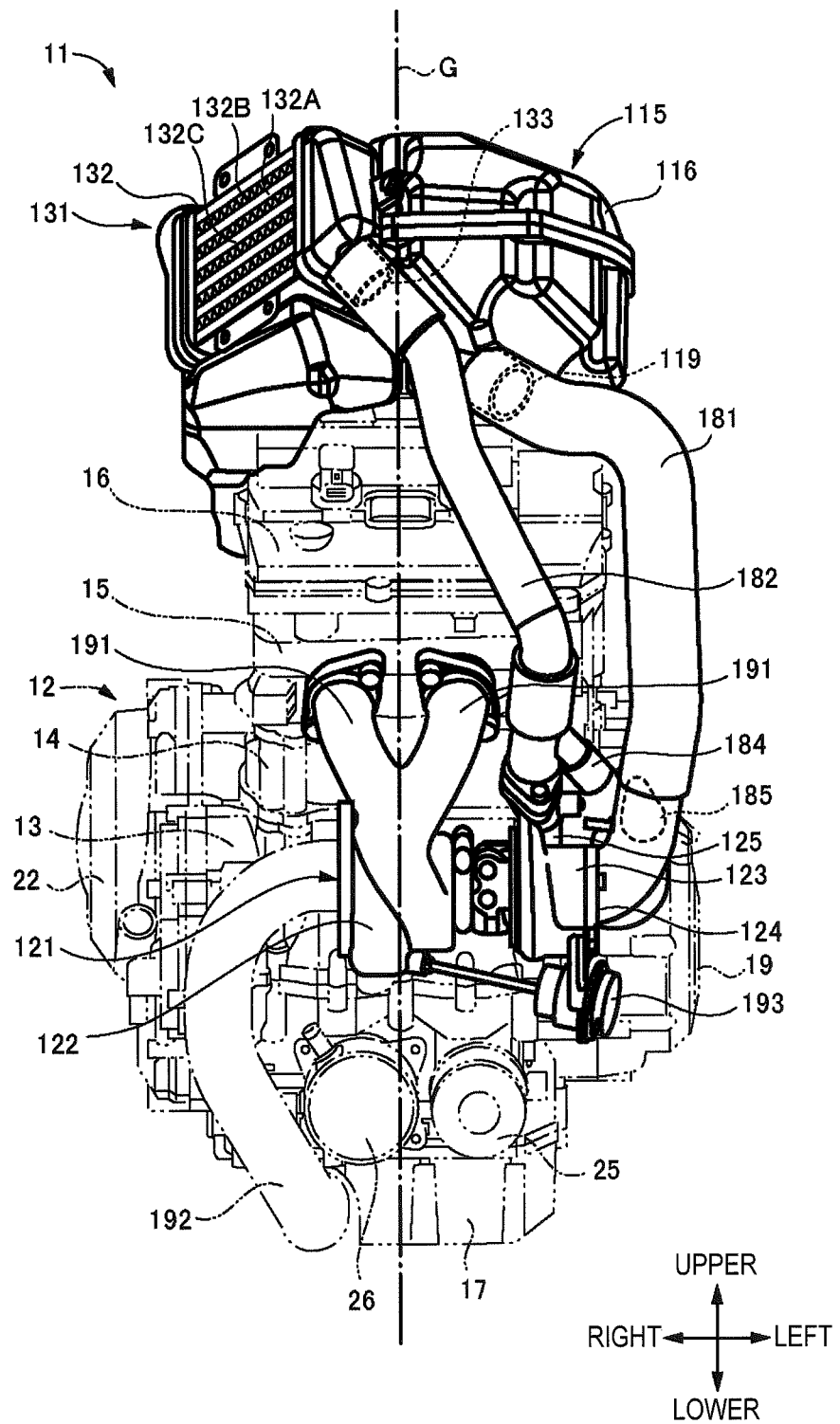
FIG. 9 illustrates arrangement of an air cleaner, the supercharger, an intercooler, the air intake pipe, the air outlet pipe and the like of the motorcycle having a supercharger, which is the first illustrative embodiment of the saddle-ridden type vehicle of the disclosure.
Figure 10:
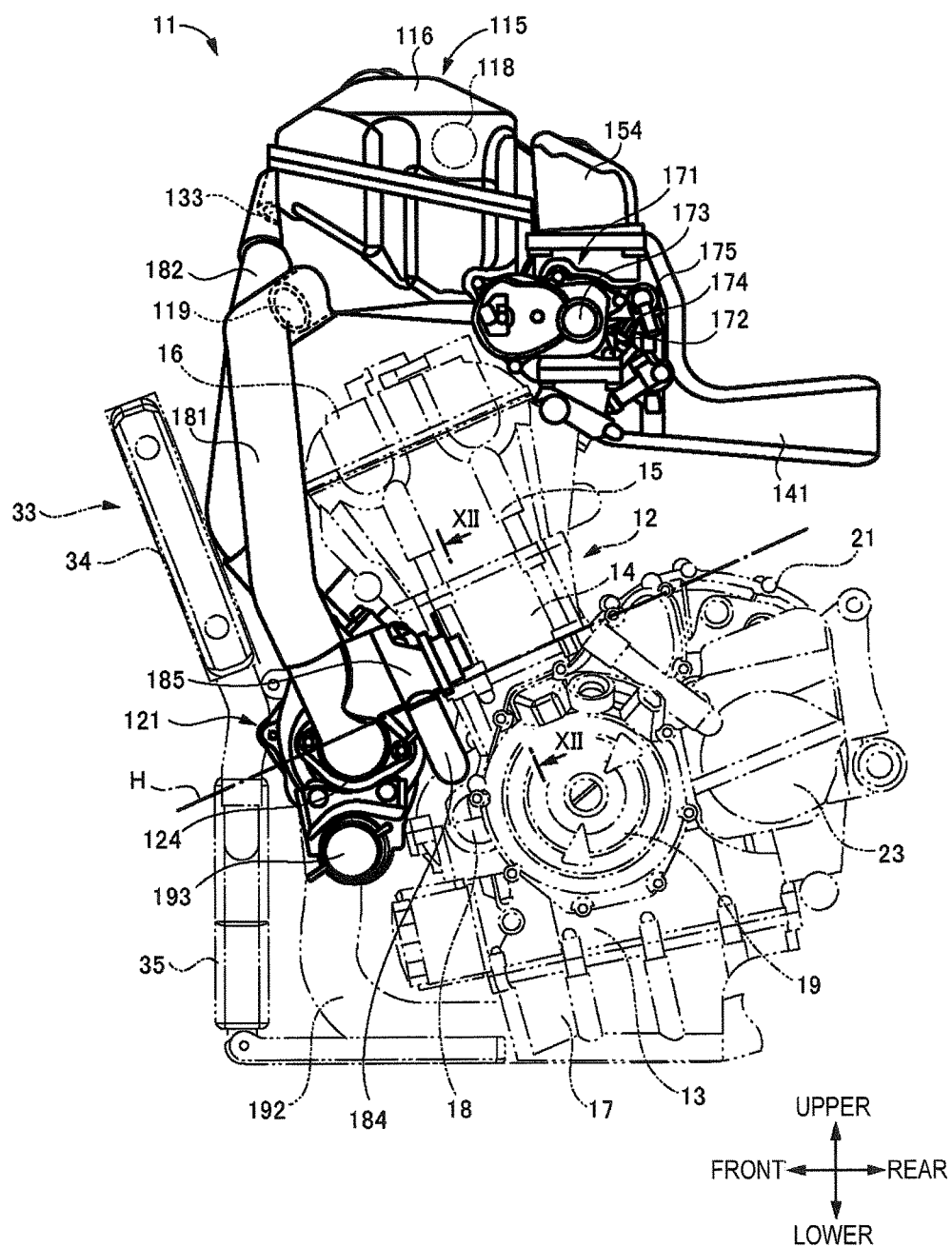
FIG. 10 illustrates arrangement of the engine, a radiator, the air cleaner, the supercharger, the air intake pipe, the air outlet pipe and the like of the motorcycle having a supercharger, which is the first illustrative embodiment of the saddle-ridden type vehicle of the disclosure.

FIGS. 8 to 10 depict arrangement and connection of the respective units configuring the intake system. As shown in FIG. 8, the supercharger 121 is disposed in front of the engine 12, specifically in front of the cylinder 14. Also, as shown in FIG. 10, the supercharger 121 is disposed above the balancer chamber 18 of the engine 12. Also, as shown in FIG. 8, the supercharger 121 is disposed so that the turbine unit 122 becomes a right side and the compressor unit 123 becomes a left side. Also, the turbine unit 122 is positioned below the exhaust ports of the engine 12 at a substantial center of the motorcycle 1 in the right-left direction of the motorcycle 1. Also, the compressor unit 123 is positioned at the left part of the motorcycle 1 and is also positioned at the left of a reference line G, which indicates a center of the motorcycle 1 in the right-left direction of the motorcycle 1.

The air cleaner 115 is disposed at an upper-left side of the engine 12, specifically at an upper-left side of the cylinder head cover 16. Also, as shown in FIG. 10, a front part of the air cleaner 115 is positioned above the supercharger 121, and the air outlet 119 formed at the front part of the air cleaner 115 is positioned just above the supercharger 121.

Also, as shown in FIG. 8, the intercooler 131 is disposed at an upper-right side of the engine 12, specifically at an upper-right side of the cylinder head cover 16. Further, as shown in FIG. 6, the intercooler 131 is disposed above the cooling water flow control unit 41. Also, the front part of the intercooler 131 is disposed above the supercharger 121, and the air inlet 133 formed at the front part of the intercooler 131 is positioned just above the supercharger 121. Also, as shown in FIG. 8, the intercooler 131 is positioned at the right of the reference line G, which indicates the center of the motorcycle 1 in the right-left direction of the motorcycle 1. That is, the intercooler 131 is disposed at an opposite position to the compressor unit 123 of the supercharger 121 with respect to the right-left direction.

Also, as shown in FIG. 9, the air cleaner 115 and the intercooler 131 are arranged side by side in the right-left direction above the engine 12 and are adjacent to each other. In the first illustrative embodiment, the intercooler 131 is attached to the right side of the air cleaner 115.

Also, as shown in FIG. 9, the air cleaner 115 and the compressor unit 123 of the supercharger 121 are interconnected by an air intake pipe 181. One end portion of the air intake pipe 181 is connected to the air outlet 119 of the air cleaner 115. Also, the other end portion of the air intake pipe 181 is connected to the air intake port 124 formed at a left part of the compressor unit 123 of the supercharger 121 and opening leftward. Also, as shown in FIG. 8, the air intake pipe 181 extends in the upper-lower direction in a region ranging from the above of the engine 12 to the front thereof at the left of the engine 12. Specifically, the air intake pipe 181 extends by a short distance from the air outlet 119 of the air cleaner 115 toward a left-lower side and passes between the left main frame 213 and the left down tube 214. Then, the air intake pipe 181 extends downward with being bent, is bent rightward and reaches the air intake port 124 of the compressor unit 123 of the supercharger 121. In the first illustrative embodiment, the air intake pipe 181 passes the left (outer side) of the left down tube 214 and is disposed close to the left down tube 214 so as to be adjacent to the center of the motorcycle 1 in the right-left direction of the motorcycle 1 as close as possible. As a result, the leftmost protruding part of the air intake pipe 181 is substantially the same as the left surface of the magneto chamber 19 of the engine 12 but is piped to be positioned at the right thereof. Also, the air intake pipe 181 is entirely positioned at the left of the reference line G. Also, the air intake pipe 181 has both bent end portions, as described above. However, most of the air intake pipe except for both end portions extends linearly.

Also, as shown in FIG. 9, the compressor unit 123 of the supercharger 121 and the intercooler 131 are interconnected by an air outlet pipe 182. One end portion of the air outlet pipe 182 is connected to the air discharge port 125 formed at an upper part of the compressor unit 123 of the supercharger 121 and opening upward. Also, the other end portion of the air outlet pipe 182 is connected to the air inlet 133 of the intercooler 131. Also, as shown in FIG. 9, the air outlet pipe 182 extends in the upper-lower direction in a region ranging from the above of the engine 12 to the front thereof at the left of the engine 12. Also, the air outlet pipe 182 is positioned at the right of the air intake pipe 181, and is positioned at an inner side of the motorcycle 1 relative to the air intake pipe 181. Also, as shown in FIG. 8, the air outlet pipe 182 passes between the pair of main frames 213 and between the pair of down tubes 214. Also, as shown in FIG. 9, the air inlet 133 of the intercooler 131 is positioned at the right of the air discharge port 125 of the compressor unit 123 of the supercharger 121. Therefore, the air outlet pipe 182 is inclined rightward as it faces upward. However, most of the air outlet pipe 182 except for an upper end portion is positioned at the left of the reference line G. Also, the air outlet pipe 182 extends linearly as a whole.

Also, as shown in FIG. 8, the air intake pipe 181 and the air outlet pipe 182 are piped with the left down tube 214 being interposed therebetween. That is, the air intake pipe 181, the left down tube 214 and the air outlet pipe 182 are disposed in corresponding order from the left side of the motorcycle 1 toward the right (from the left outer side toward the inner side). Also, the air intake pipe 181 and the air outlet pipe 182 are arranged side by side in the right-left direction in the left region of the motorcycle 1, and extend in the substantially same direction, i.e., in the upper-lower direction. Also, the air intake pipe 181 and the air outlet pipe 182 are respectively piped along the left down tube 214 extending from the center of the motorcycle 1 in the right-left direction of the motorcycle 1 toward the left-lower side, as seen in a front view of the motorcycle 1.

In the meantime, as shown in FIG. 5, the surge tank 154 is disposed at the upper-rear side of the engine 12. Specifically, the surge tank 154 is disposed adjacent to the air cleaner 115 in the front-rear direction at the rear of the air cleaner 115. Also, the surge tank 154 is disposed close to the intercooler 131 disposed adjacent to the right side of the air cleaner 115. Also, as seen in a plan view of the motorcycle 1, the air cleaner 115, the intercooler 131 and the surge tank 154 are disposed in a triangular shape in a region above the engine 12 (for example, when the centers of the three components are linearly connected, a triangle is formed in the region above the engine 12).

Also, the intercooler 131 and the surge tank 154 are interconnected by a connecting pipe 183. The connecting pipe 183 is disposed at a right-rear side above the engine 12. Specifically, one end portion of the connecting pipe 183 is connected to the air outlet 134 of the intercooler 131, and the other end portion is connected to the air inlet 156 of the surge tank 154. Since the air outlet 134 of the intercooler 131 and the air inlet 156 of the surge tank 154 are disposed close to each other, a length of the connecting pipe 183 configured to connect them is short.

Also, as shown in FIG. 3, the throttle body 172 of the electronic control throttle device 171 is disposed between the surge tank 154 and the intake port of the engine 12 at a rear-upper side of the engine 12.

In the intake system connected as described above, the air introduced from the outside normally sequentially passes through the air cleaner 115, the air intake pipe 181, the compressor unit 123 of the supercharger 121, the air outlet pipe 182, the intercooler 131, the connecting pipe 183, the surge tank 154 and the throttle body 172 of the electronic control throttle device 171, and is then supplied to the intake port of the engine 12.

(Bypass Between Upstream and Downstream Sides of Supercharger)

Also, as shown in FIG. 10, the intake system of the motorcycle 1 is provided with an air bypass piping 184 serving as the air bypass passage and configured to interconnect the air intake pipe 181 and the air outlet pipe 182 without interposing the compressor unit 123 of the supercharger 121 and an air bypass valve 185 configured to switch communication and cutoff of the air bypass piping 184. The air bypass valve 185 is an electromagnetic valve, for example, and the opening and closing of the air bypass valve 185 is controlled by a control signal from a control unit provided in the motorcycle 1. The air bypass valve 185 opens when the throttle valve is completely closed upon deceleration, for example. Thereby, the air outlet pipe 182 and the air intake pipe 181 are enabled to communicate with each other via the air bypass piping 184 and the compressed air downstream of the compressor unit 123 of the supercharger 121 is escaped upstream, so that a downstream pressure of the compressor unit 123 is lowered.

Figure 11:
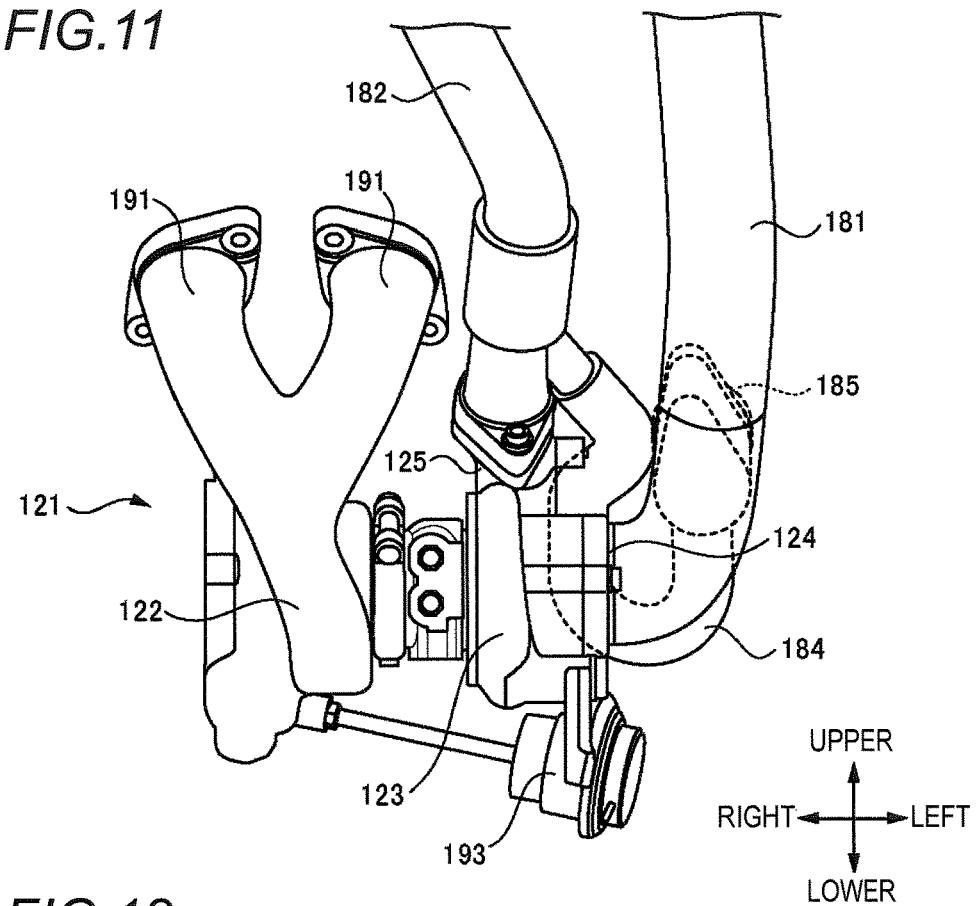
FIG. 11 illustrates arrangement of the supercharger, the air intake pipe, the air outlet pipe, an air bypass piping and an air bypass valve of the motorcycle having a supercharger, which is the first illustrative embodiment of the saddle-ridden type vehicle of the disclosure.
Figure 12:
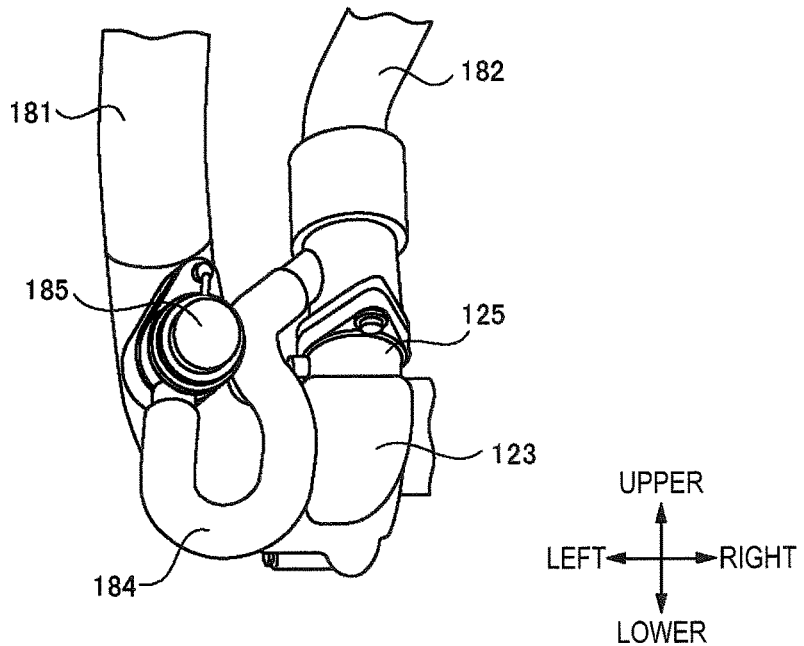
FIG. 12 illustrates the air intake pipe, the air outlet pipe, the air bypass piping, the air bypass valve and the like, as seen from an arrow XII-XII direction of FIG. 10.

FIG. 11 depicts the air bypass piping 184 and the air bypass valve 185 together with the supercharger 121, the air intake pipe 181 and the air outlet pipe 182. Also, FIG. 12 depicts the air bypass piping 184, the air bypass valve 185 and the like, as seen from an arrow XII-XII direction in FIG. 10.

As shown in FIG. 11, the air bypass valve 185 is disposed at the rear of the air intake pipe 181 extending in the upper-lower direction at the left front of the engine 12. Specifically, the air bypass valve 185 is attached to a rear part of an end portion of the air intake pipe 181, which is connected to the air intake port 124 of the compressor unit 123 of the supercharger 121, by using a bolt or the like.

Also, as shown in FIG. 10, the air bypass valve 185 is disposed at a position higher than the crank case 13. Specifically, the air bypass valve 185 is positioned at a side of the front part of the cylinder 14. That is, the air bypass valve 185 is disposed at a position overlapping with the front part of the cylinder 14, as seen in a side view of the motorcycle 1. In the meantime, a reference line H in FIG. 10 indicates a boundary between the crank case 13 and the cylinder 14.

Also, as shown in FIG. 9, the air bypass valve 185 is disposed at the left of the left side surface of the cylinder 14 in the vehicle width direction. Also, as shown in FIG. 5, a part of the air bypass valve 185 is positioned at the left of the leftmost protruding part of the left main frame 213. Also, as shown in FIG. 11, the air outlet pipe 182 is positioned between the air bypass valve 185 and the supercharger 121.

Also, as shown in FIG. 12, the air bypass piping 184 is a hose, for example, and has one end-side connected to the air outlet pipe 182 and the other end-side connected to the air bypass valve 185. Specifically, one end-side of the air bypass piping 184 is connected to a left part of a part of the air outlet pipe 182, which is connected to the air discharge port 125 of the compressor unit 123 of the supercharger 121. Also, the other end-side of the air bypass piping 184 is connected to a lower part of the air bypass valve 185. Also, in the first illustrative embodiment, as shown in FIG. 12, the air bypass piping 184 is curved. When the air bypass valve 185 is opened, a passage configured to communicate with an inside of the air intake pipe 181 via an inside of the air bypass piping 184 and an inside of the air bypass valve 185 is formed from an inside of the air outlet pipe 182. On the other hand, when the air bypass valve 185 is closed, the passage is blocked.

As described above, according to the motorcycle 1, which is the first illustrative embodiment of the saddle-ridden type vehicle, the air bypass valve 185 is disposed at the rear of the air intake pipe 181 extending in the upper-lower direction in the region ranging from the above of the engine 12 from the front thereof at the left of the motorcycle 1, so that it is possible to heighten the position of the air bypass valve 185. That is, it is possible to dispose the air bypass valve 185 at a position higher than the crank case 13, specifically at the side of the cylinder 14. The air bypass valve 185 is disposed at the high position, so that it is possible to bring the air bypass valve 185 close to a head of a driver sitting on the seat 242 of the motorcycle 1. Therefore, it is possible to enable the driver to easily hear an air shooting sound upon the opening of the air bypass valve 185.

Also, the air bypass valve 185 is disposed at the rear of the air intake pipe 181 extending in the upper-lower direction at the left front of the engine 12, so that it is possible to position the air bypass valve 185 at the left-outer side of the motorcycle 1. That is, it is possible to dispose the air bypass valve 185 at the left of the left side surface of the cylinder 14. As a result, since the engine 12 is not interposed between the driver sitting on the seat 242 of the motorcycle 1 and the air bypass valve 185, the air shooting sound can easily reach ears of the driver upon the opening of the air bypass valve 185.

In this way, the driver can easily hear the air shooting sound upon the opening of the air bypass valve 185, so that it is possible to express the existence of the air bypass valve 185 and to thereby increase the charms of the engine 12 having the supercharger.

Also, it is possible to easily position the air bypass valve 185 at a place, at which it can be easily seen from the outside, by disposing the air bypass valve 185 at the high left-outer position. For example, when the side surfaces of the cylinder 14 and the cylinder head 16 are exposed to the outside without being covered by a cowl so as to improve the design property of the motorcycle 1, as seen in a side view of the motorcycle 1, the air bypass valve 185 disposed at the side of the cylinder 14 can also be exposed to the outside. In this way, the air bypass valve 185 is disposed at an easy-to-see position, so that it is possible to express the existence of the air bypass valve 185 and to thereby increase the charms of the engine 12 having the supercharger.

Also, the air bypass valve 185 is disposed at the rear of the air intake pipe 181, so that it is possible to prevent the air bypass valve 185 from being exposed to the front of the motorcycle 1. Therefore, it is possible to prevent a situation where a stone flying from the front collides with the air bypass valve 185 and damages the air bypass valve 185.

Also, according to the motorcycle 1, since the air outlet pipe 182 is interposed between the air bypass valve 185 and the supercharger 121, it is possible to make it difficult for the heat of the supercharger 121 to be transferred to the air bypass valve 185 and to thus protect the air bypass valve 185 from the heat of the supercharger 121.

Also, according to the motorcycle 1, the air intake pipe 181 and the air outlet pipe 182 extending in the upper-lower direction with being disposed adjacent to each other side by side in the right-left direction are interconnected by the air bypass piping 184, so that it is possible to shorten the air bypass piping 184 and to thereby make the smooth flowing of the air in the air bypass piping 184.

In the first illustrative embodiment, the air bypass valve 185 is attached to the air intake pipe 181, one end-side of the air bypass piping 184 is connected to the air outlet pipe 182, and the other end-side is connected to the air bypass valve 185. However, the air bypass valve 185 may be attached to the air outlet pipe 182, one end-side of the air bypass piping 184 may be connected to the air bypass valve 185 and the other end-side may be connected to the air intake pipe 181.

In the first illustrative embodiment, as shown in FIG. 6, the components of the cooling system such as the water pump 30, the cooling water flow control unit 41, the water pump inlet hose 55 and the like are disposed at the right side of the motorcycle 1, and the components of the intake system such as the air cleaner 115, the compressor unit 123 of the supercharger 121, the air intake pipe 181, the air outlet pipe 182 and the like are disposed at the left side of the motorcycle 1. However, the disclosure is not limited thereto. For example, the arrangements of the components may be reversed with respect to the right-left direction. In this case, the air bypass piping 184 and the air bypass valve 185 are disposed at the right of the motorcycle 1.

Also, the saddle-ridden type vehicle of the disclosure is not limited to the motorcycle and can be applied to a variety of saddle-ridden type vehicles such as a three-wheeled vehicle, a buggy car or the like having an engine.

Also, the disclosure can be appropriately changed without departing from the gist or spirit of the inventions that can be understood from the claims and the entire specification, and a saddle-ridden type vehicle having the change is also included in the technical spirit of the disclosure.

[Second Illustrative Embodiment]

Hereinafter, a second illustrative embodiment according to the disclosure will be described with reference to FIGS. 13 to 23. The same reference numerals and signs will be used in the drawings in order to designate some components when they are the same as or similar to those of the first illustrative embodiment.

(Motorcycle Having Supercharger)

Figure 13:
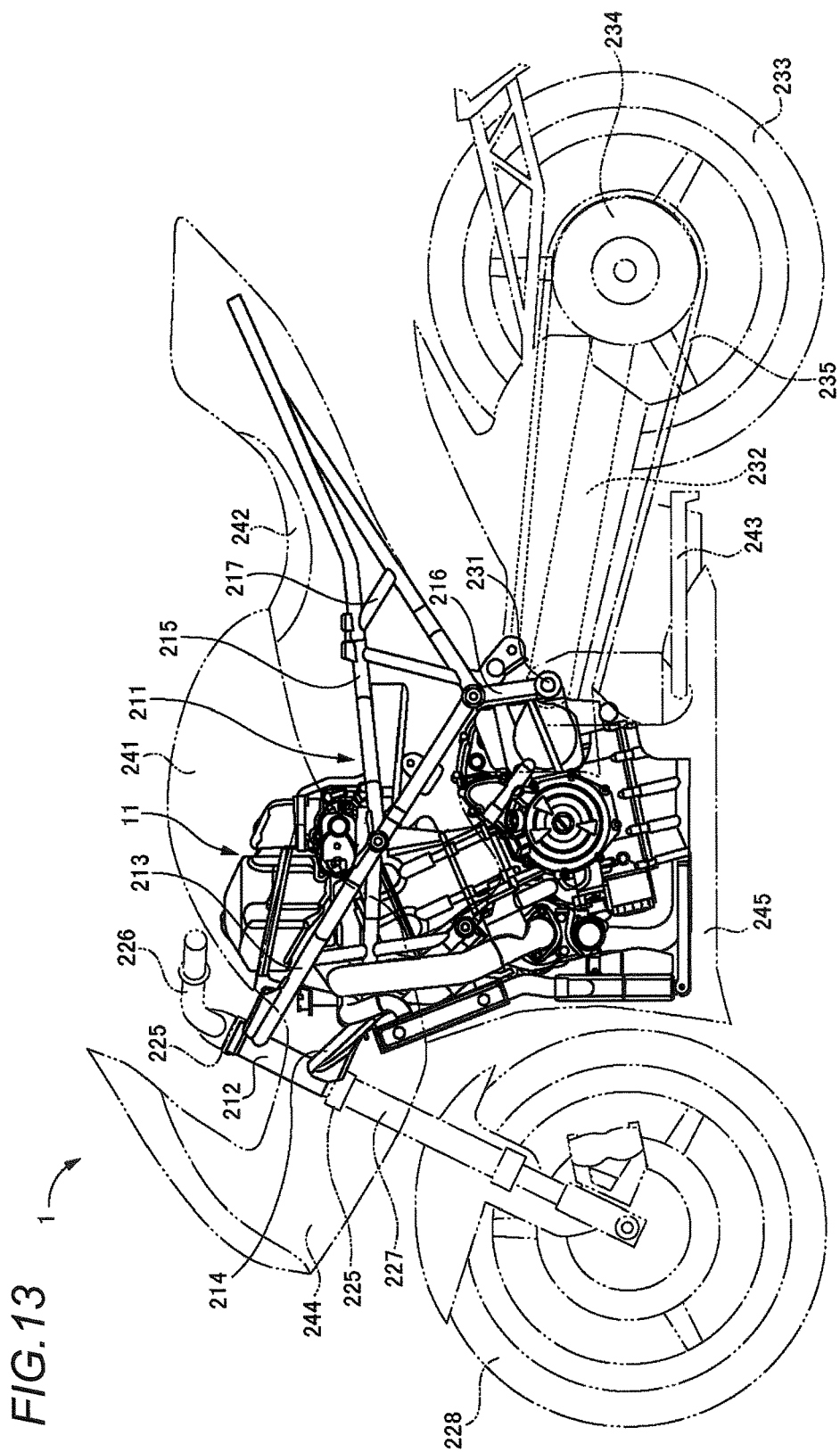
FIG. 13 illustrates a motorcycle having a supercharger, which is a second illustrative embodiment of the saddle-ridden type vehicle of the disclosure.
Figure 14:
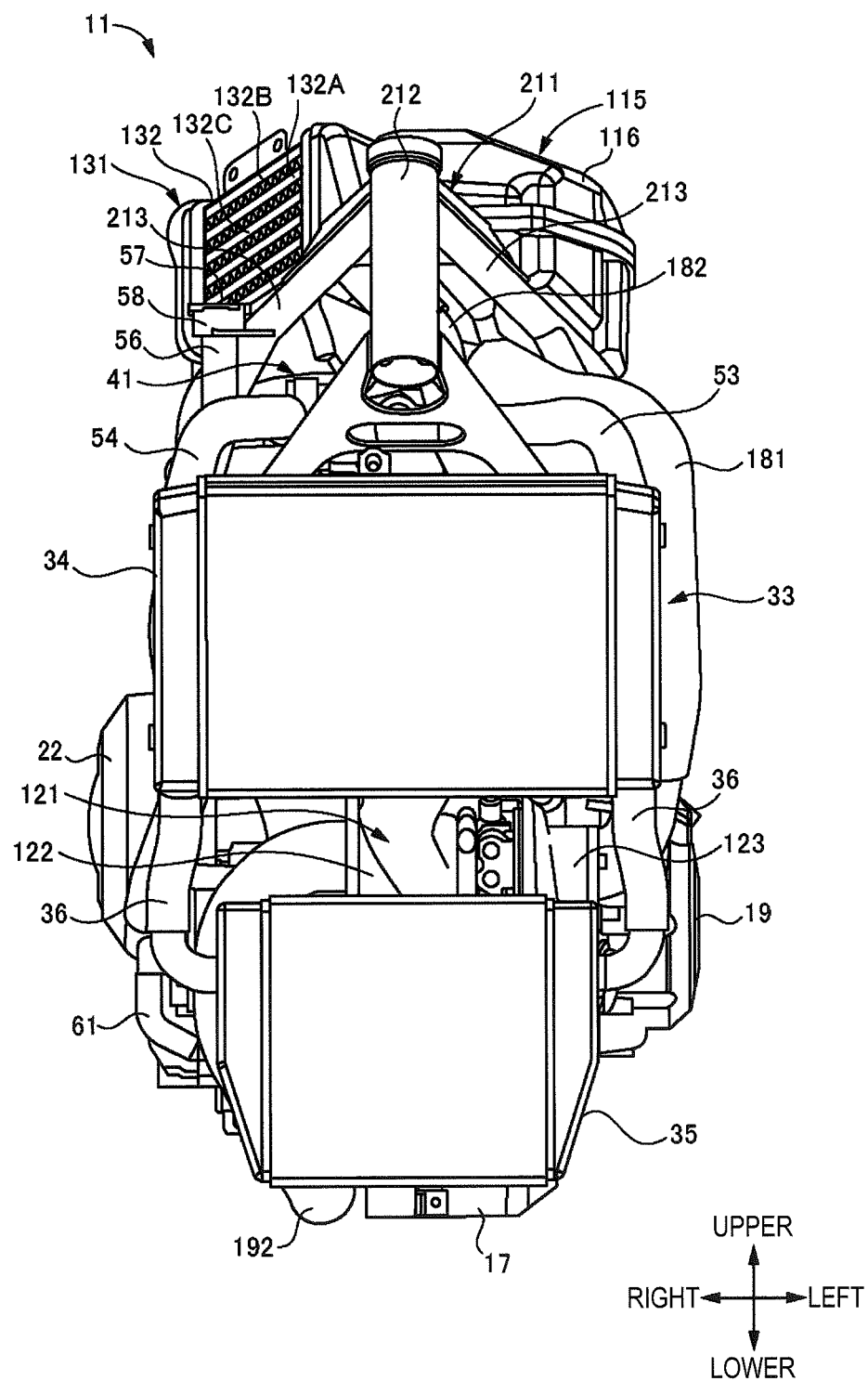
FIG. 14 is a front view of a vehicle body frame and an engine unit of the motorcycle having a supercharger, which is the second illustrative embodiment of the saddle-ridden type vehicle of the disclosure.
Figure 18:
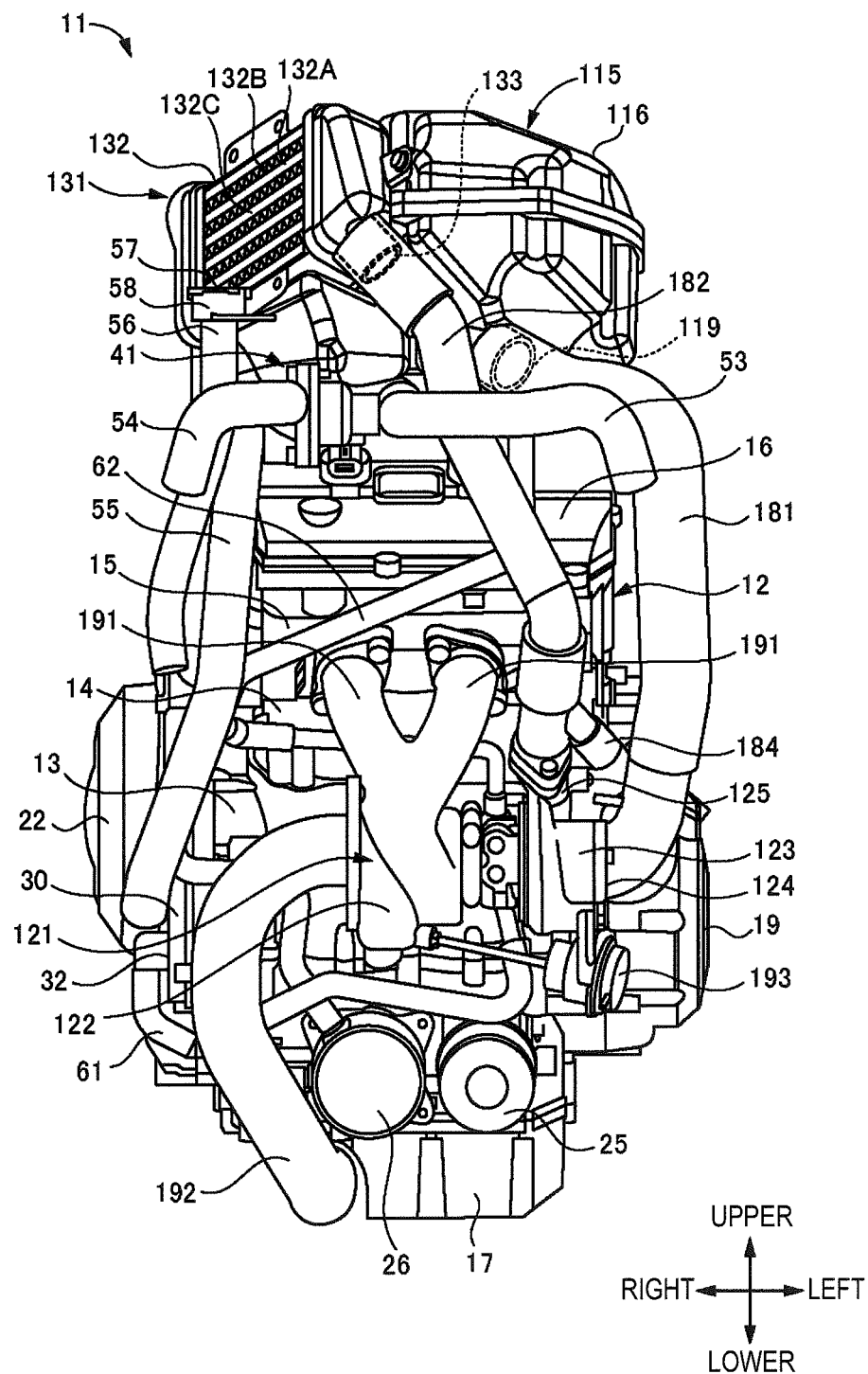
FIG. 18 is a front view depicting a state where a radiator has been removed from the engine unit shown in FIG. 14.
Figure 19:
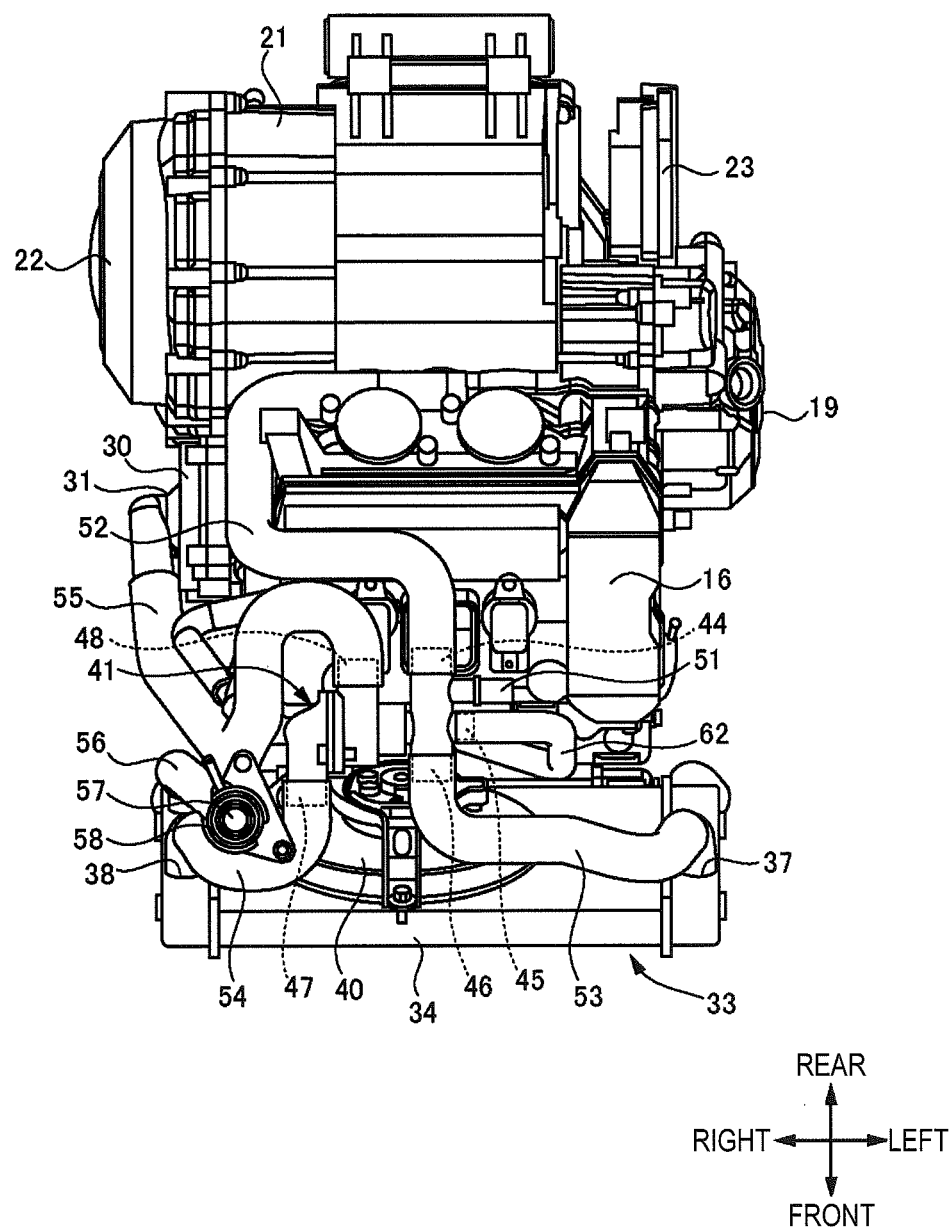
FIG. 19 is a plan view depicting a state where an air cleaner, an intercooler, an air discharging duct, a surge tank and the like have been removed from the engine unit shown in FIG. 17.

FIG. 13 illustrates a motorcycle having a supercharger, which is a second illustrative embodiment of the saddle-ridden type vehicle of the disclosure. In FIG. 13, parts except for a vehicle body frame 211 and an engine unit 11 of the motorcycle having the supercharger are shown with a dashed-two dotted line for convenience of explanations. Also, FIGS. 14 to 17 are a front view, a left side view, a right side view and a plan view of the vehicle body frame 211 and the engine unit 11, and FIG. 18 is a front view depicting a state where a radiator 33 has been removed from the engine unit 11. FIG. 19 is a plan view depicting a state where an air cleaner 116, an intercooler 131, and a surge tank 154 have been removed from the engine unit 11. Also, in below descriptions of the second illustrative embodiment, front, rear, right, left, upper and lower directions are described on the basis of a driver who sits on a seat of the motorcycle having the supercharger.

In FIG. 13, a vehicle body frame 211 of a motorcycle 1 having a supercharger, which is the second illustrative embodiment of the saddle-ridden type vehicle of the disclosure, is formed by joining a plurality of steel pipes, for example. Specifically, the vehicle body frame 211 has a head pipe 212 disposed at a front-upper side of the motorcycle 1, a pair of main frames 213 each of which is disposed at right and left sides of the motorcycle 1, respectively, and has a front end portion connected to an upper part of the head pipe 212 and a rear end-side extending rearward with being inclined downward, a pair of down tubes 214 each of which is disposed at the right and left sides of the motorcycle 1, respectively, and has a front end portion connected to a lower part of the head pipe 212 and a rear end-side extending rearward with being inclined downward beyond the main frame 213, a pair of side frames 215 each of which is disposed at the right and left sides of the motorcycle 1, respectively, and has a front end portion connected to an intermediate part of the down tube 214 and a rear end-side extending rearward, and a pair of pivot frames 216 joined to the rear end-sides of the main frames 213. Also, a reinforcement frame 217 is provided among the main frame 213, the down tube 214 and the side frame 215. The down tubes 214 are a specific example of frame members.

Figure 15:
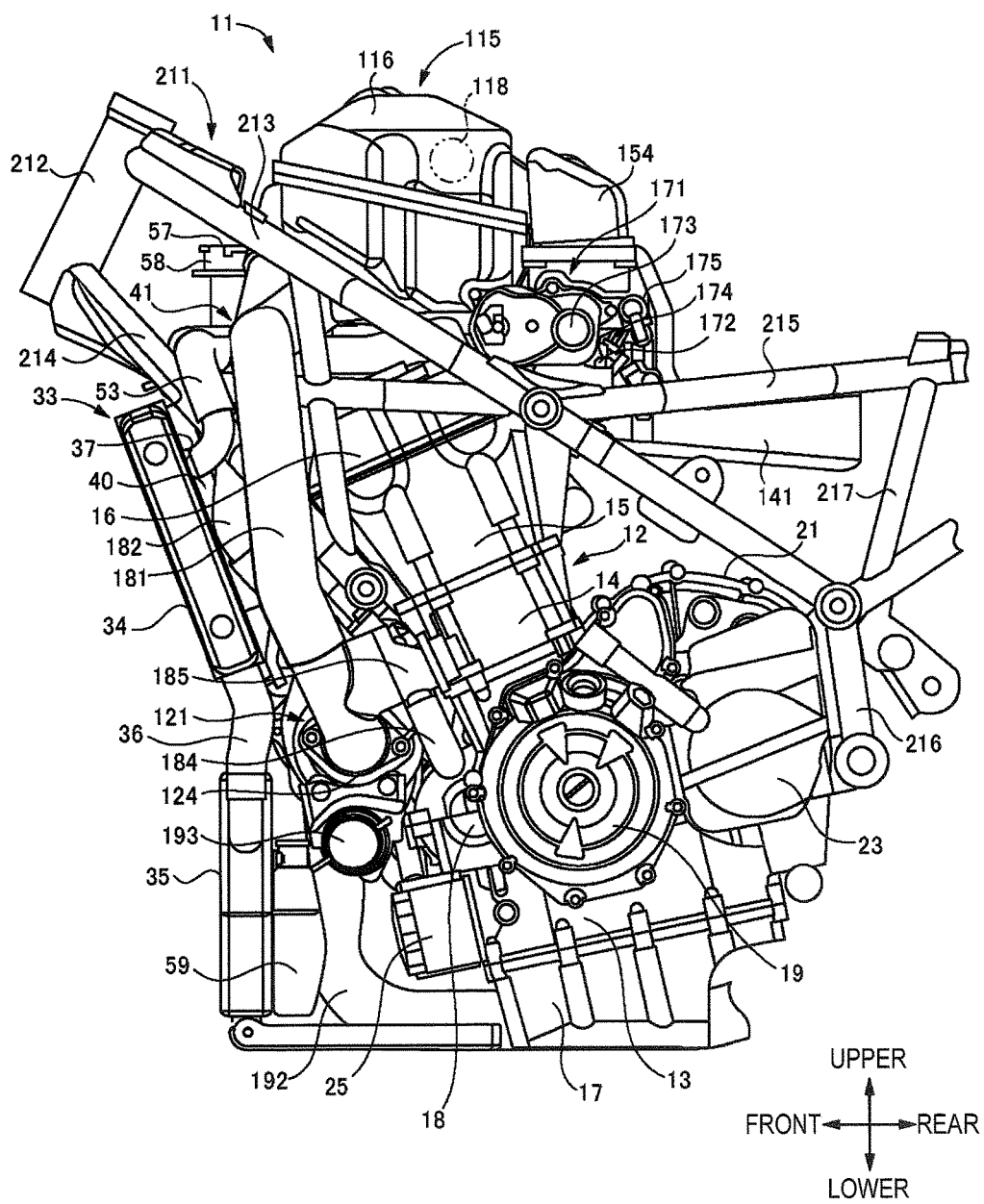
FIG. 15 is a left side view of the vehicle body frame and the engine unit shown in FIG. 14.
Figure 17:
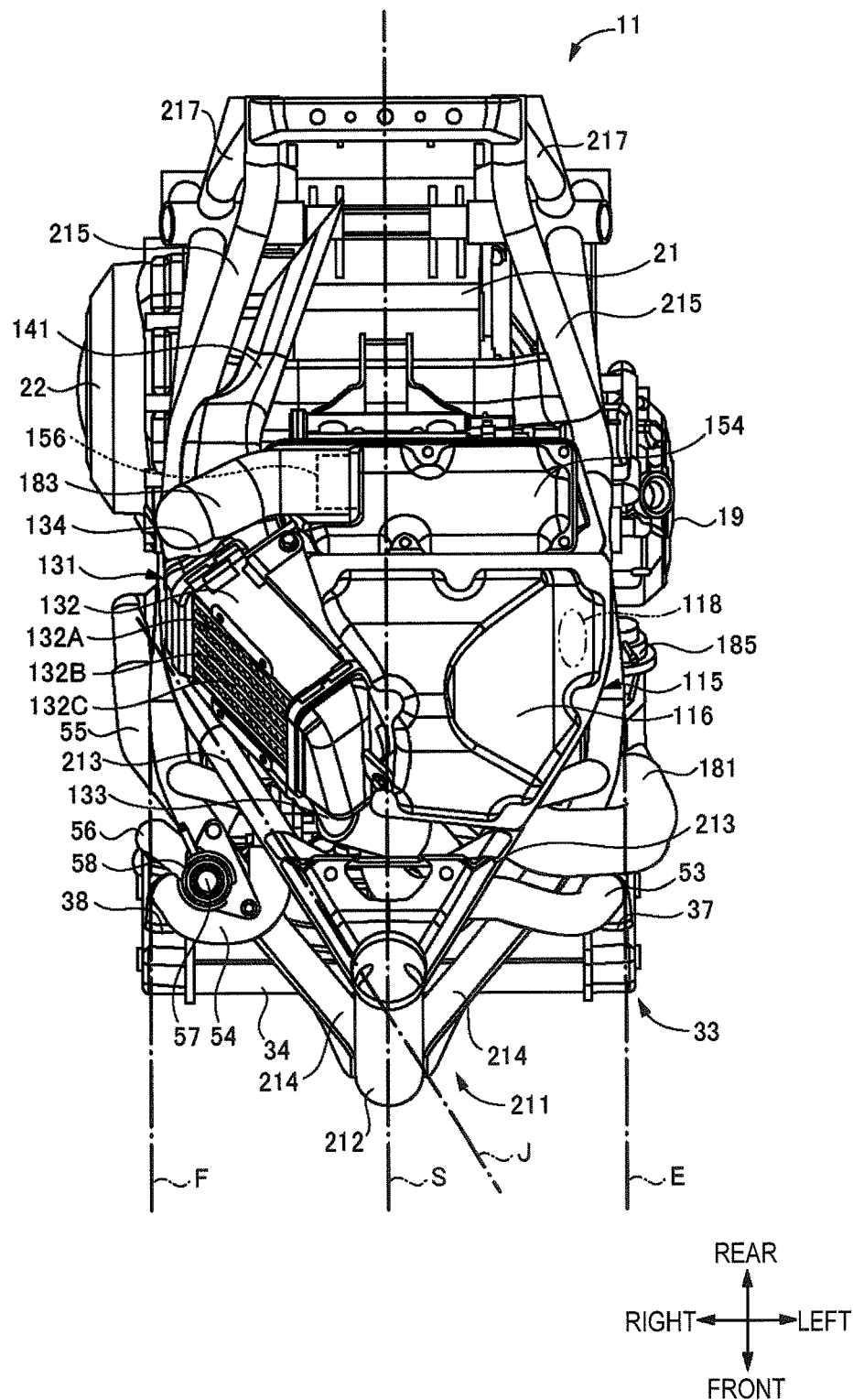
FIG. 17 is a plan view of the vehicle body frame and the engine unit shown in FIG. 14.

Also, as shown in FIG. 17, the pair of main frames 213 extends rearward from the head pipe 212 with expanding leftward and rightward, respectively. That is, when a line passing a center of the motorcycle 1 in a right-left direction (vehicle width direction) of the motorcycle 1 in a front-rear direction of the motorcycle 1 is denoted as a reference line S, a front end portion of the right main frame 213 obliquely extends toward a right-rear side from the head pipe 212 disposed at a center of the motorcycle 1 in the right-left direction of the motorcycle 1. Then, the right main frame 213 is gently bent in the vicinity of a rear-right side of a cylinder head 15 of an engine 12 and extends rearward in parallel with the reference line S. Then, the right main frame 213 is slightly bent at a part beyond a rear surface of the cylinder head 15, and extends rearward with being slightly inclined leftward so as to gradually come close to the reference line S. In the meantime, the left main frame 213 has a substantially bilaterally symmetric shape to the right main frame 213 with respect to the reference line S. Also, the pair of down tubes 214 extends rearward from the head pipe 212 with expanding leftward and rightward, respectively, like the pair of main frames 213. Also, as shown in FIG. 15, the pair of down tubes 214 is positioned below the pair of main frames 213, a space is formed between the left main frame 213 and the left down tube 214, and a space is formed between the right main frame 213 and the right down tube 214.

Also, as shown in FIG. 13, a steering shaft (not shown) is inserted into the head pipe 212, and upper and lower end portions of the steering shaft are respectively provided with steering brackets 225. Also, the upper steering bracket 225 is provided with a handlebar 226. A pair of right and left front forks 227 is supported at upper parts thereof to the upper and lower steering brackets 225, and a front wheel 228 is supported to lower ends of the front forks 227.

Also, a front end-side of a swing arm 232 is supported between the pair of right and left pivot frames 216 via a pivot shaft 231, and a rear wheel 233 is supported to a rear end-side of the swing arm 232. Also, an axle of the rear wheel 233 is provided with a driven sprocket 234, and a chain 235 configured to transmit power of the engine 12 (which will be described later) is wound on the driven sprocket 234.

Also, the engine unit 11 is provided between the front wheel 228 and the rear wheel 233 of the motorcycle 1. The engine unit 11 is mainly disposed between the left main frame 213 and left down tube 214 and the right main frame 213 and right down tube 214 and is supported to the corresponding frames. Also, a fuel tank 241 is provided above the engine unit 11, and a seat 242 is provided at the rear of the fuel tank 241. Also, a side stand 243 is provided at the left side of the motorcycle 1 and at a lower-rear part of the engine unit 11. Also, an upper cowl 244 is provided at a front-upper side of the motorcycle 1. Also, the motorcycle 1 is provided with an under cowl 245 configured to mainly cover a front-lower side of the engine unit 11.

(Engine Unit)

As shown in FIG. 15, the engine unit 11 has the engine 12, parts of a driving system configured to transmit power of the engine 12 to the rear wheel 233, such as a primary deceleration mechanism, a clutch, a transmission and the like, a lubrication system configured to lubricate a moveable part of the engine 12, an intake system (including a supercharger 121) configured to supply a fuel-air mixture of air and fuel to the engine 12, parts of an exhaust system configured to discharge an exhaust gas, which is to be generated as the fuel-air mixture is combusted, from the engine 12, a cooling system configured to cool the engine 12 and the like, an AC generator configured to generate power by using rotation of a crankshaft, and the like.

In the second illustrative embodiment, the engine 12 is a water-cooling type parallel two-cylinder four-cycle gasoline engine, for example. The engine 12 has a crank case 13 configured to accommodate therein a crankshaft, a cylinder 14 provided above the crank case 13, a cylinder head 15 provided above the cylinder 14 and a cylinder head cover 16 provided above the cylinder head 15. Also, an oil pan 17 is provided below the crank case 13. A cylinder axis of the engine 12 is inclined so that an upper side is located at a forward position relative to a lower side. The engine 12 is provided with a balance shaft configured to reduce vibrations, which are to be generated by movement of a piston. The balance shaft is disposed in front of the crankshaft. Specifically, a balancer chamber 18 is integrally formed at a front part of the crank case 13 of the engine 12. The balancer chamber 18 is formed by expanding forward a part of the crank case 13. A front part of the balancer chamber 18 protrudes forward from a front wall part of the crank case 13. The balance shaft is provided in the balancer chamber 18. Also, a left part of the crank case 13 is provided with a magneto chamber 19, and the AC generator is accommodated in the magneto chamber 19.

Figure 16:
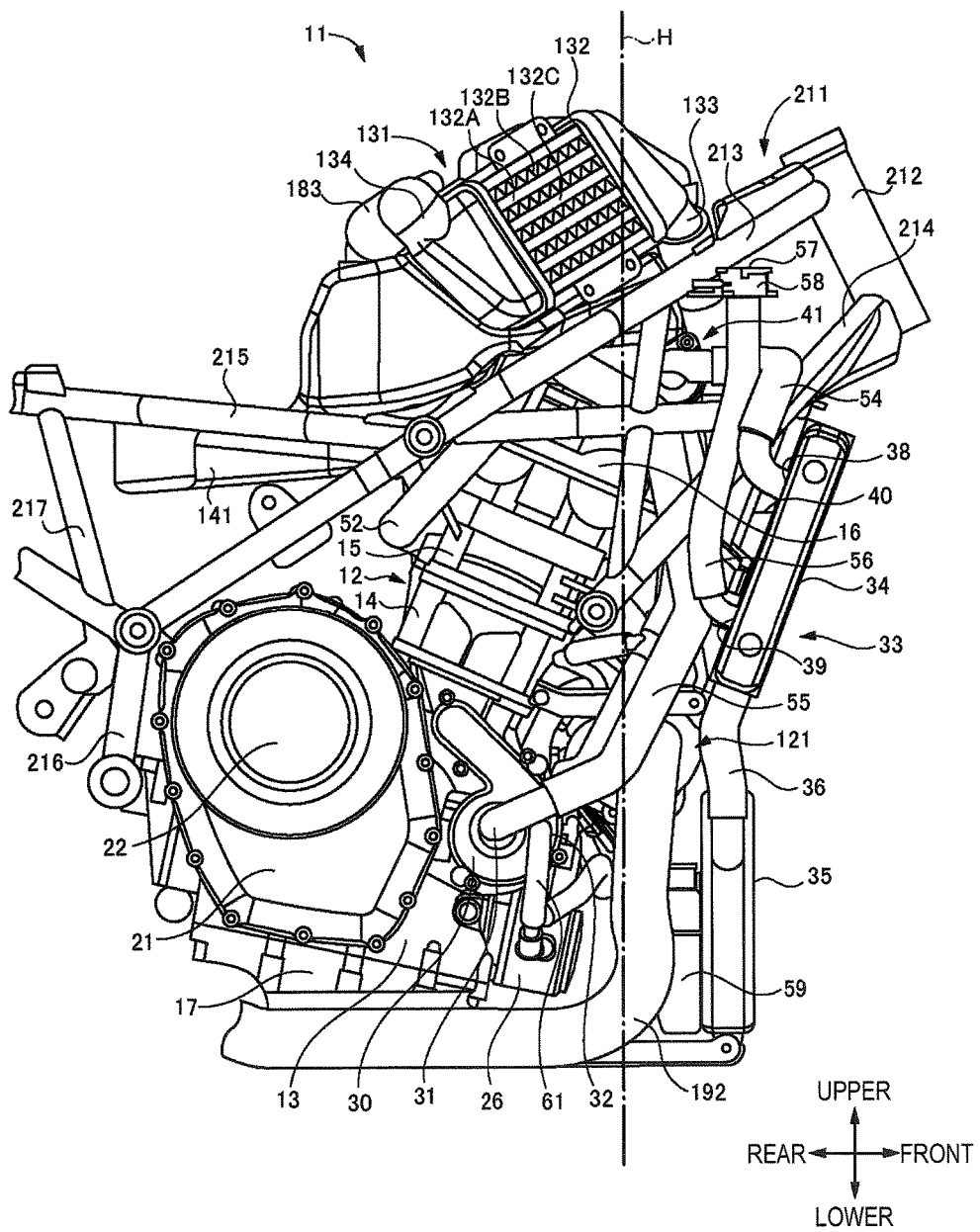
FIG. 16 is a right side view of the vehicle body frame and the engine unit shown in FIG. 14.

Also, as shown in FIG. 16, parts of the driving system such as the primary deceleration mechanism, the clutch, the transmission and the like are disposed at the rear part of the engine unit 11. That is, a transmission case 21 is integrally formed at rear sides of the crank case 13 and the cylinder 14, and the primary deceleration mechanism and the transmission are accommodated in the transmission case 21. Also, a clutch cover 22 is attached to a right part of the transmission case 21, and the clutch disposed at the right of the transmission is covered by the clutch cover 22. Also, as shown in FIG. 15, a sprocket cover 23 is provided at a left part of the transmission case 21, and a drive sprocket disposed at a left side of the transmission is covered by the sprocket cover 23. Also, the drive sprocket is wound with a chain 235 configured to transmit the power of the engine 12 to the rear wheel 233, as shown in FIG. 13.

Also, as shown in FIG. 18, the lubrication system has an oil pump configured to pump engine oil stored in the oil pan 17 of the engine 12 and to supply the same to the respective parts of the engine 12, an oil filter 25 configured to filter the engine oil and a water-cooling type oil cooler 26 configured to cool the engine oil. The oil filter 25 and the oil cooler 26 are attached to a front-lower side of the engine 12.

Also, as shown in FIG. 16 or 19, the cooling system has a water pump 30, a water jacket (not shown), a radiator 33 and a cooling water flow control unit 41. The water pump 30 is a device configured to operate by using the rotation of the crankshaft and to discharge the cooling water to the water jacket. The water jacket is a mechanism provided in the cylinder 14 and the cylinder head 15 and configured to cool the cylinder 14 and the cylinder head 15 by the cooling water.

The radiator 33 is a device configured to receive traveling wind or to drive a radiator fan 40, thereby radiating heat of the cooling water to the atmosphere to cool the cooling water. The radiator 33 is disposed at the front of the engine 12. Also, the radiator 33 has an upper radiator 34 and a lower radiator 35. The upper radiator 34 and the lower radiator 35 are interconnected via a pair of connecting hoses 36. Also, as shown in FIG. 19, the radiator fan 40 is attached at a position toward the right of a rear surface of the upper radiator 34.

Figure 20:
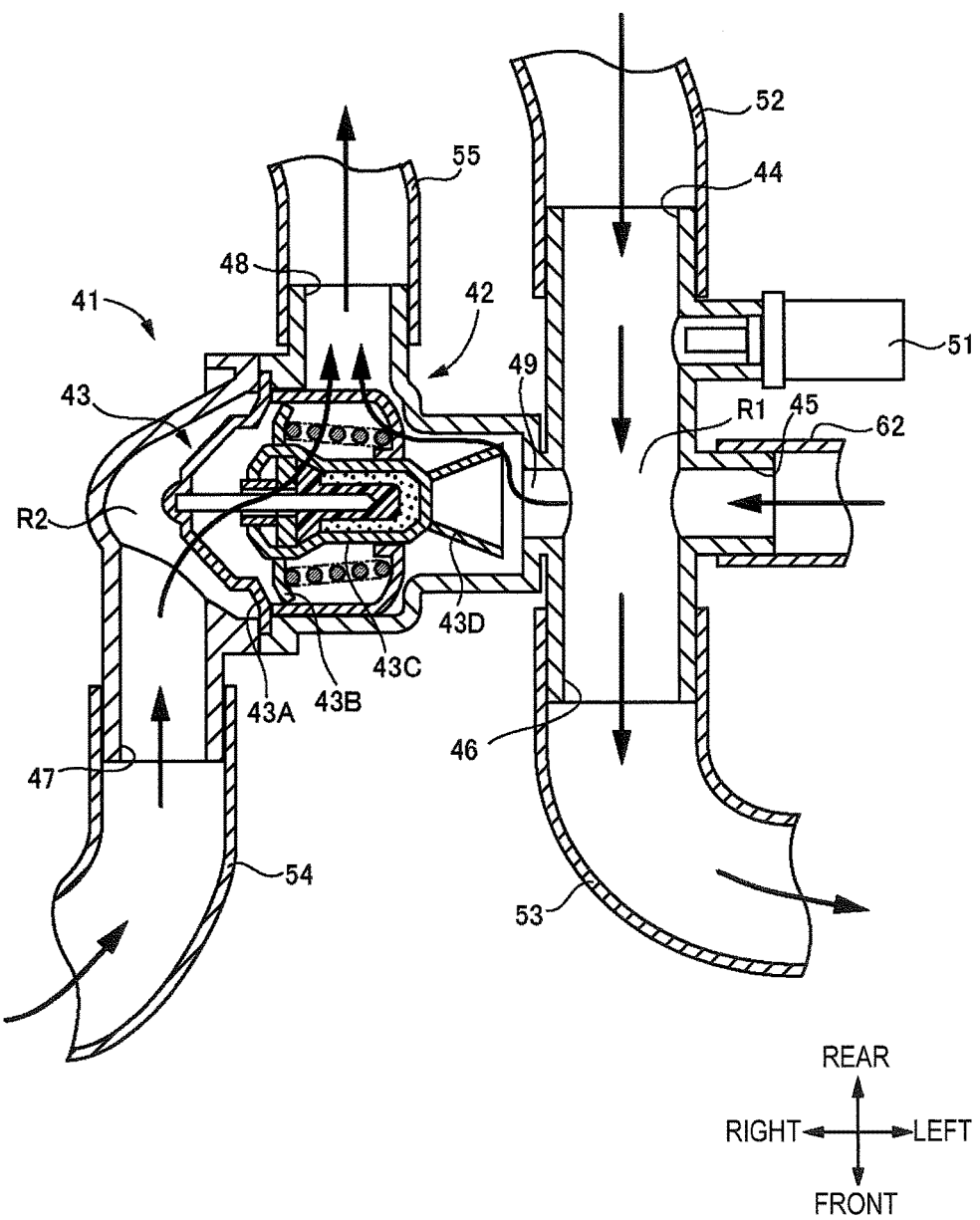
FIG. 20 illustrates an inside of a cooling water flow control unit of the motorcycle having a supercharger, which is the second illustrative embodiment of the saddle-ridden type vehicle of the disclosure.

The cooling water flow control unit 41 is a device configured to regulate an amount of the cooling water to flow in the radiator 33 in accordance with a temperature of the cooling water and to maintain the temperature of the cooling water to an appropriate temperature. FIG. 20 depicts an inside of the cooling water flow control unit 41. As shown in FIG. 20, the cooling water flow control unit 41 has a thermostat housing 42 and a thermostat 43. Also, a left chamber R1 is formed in a left part of the thermostat housing 42, and a right chamber R2 is formed in a right part thereof. Also, a left-rear side of the thermostat housing 42 is formed with a first cooling water inlet 44 for introducing the cooling water from the water jacket into the left chamber R1. Also, a left side of a left part of the thermostat housing 42 is formed with a second cooling water inlet 45 for introducing the cooling water having cooled the oil cooler 26 and the supercharger 121 into the left chamber R1. Also, the left-front side of the thermostat housing 42 is formed with a cooling water delivery port 46 for delivering the cooling water introduced into the left chamber R1 to the radiator 33. Also, a right-front side of the thermostat housing 42 is formed with a cooling water return port 47 for introducing the cooling water having flowed in the radiator 33 into the right chamber R2. Also, a right-rear side of the thermostat housing 42 is formed with a cooling water outlet 48 for returning the cooling water introduced in the right chamber R2 to the water pump 30. Also, the thermostat housing 42 is formed therein with a cooling water bypass passage 49 configured to supply the cooling water from the left chamber R1 to the right chamber R2 without flowing the cooling water in the radiator 33. Also, the right chamber R2 is provided with the thermostat 43. Also, a water temperature sensor 51 configured to detect the temperature of the cooling water flowing in the left chamber R1 is attached to the left part of the thermostat housing 42.

The thermostat 43 is configured to control opening and closing of a flow path between the cooling water return port 47 and the cooling water outlet 48 and opening and closing of a flow path between the cooling water bypass passage 49 and the cooling water outlet 48, in accordance with the temperature of the cooling water introduced into the right chamber R2. Specifically, when the temperature of the cooling water introduced into the right chamber R2 is equal to or lower than a predetermined reference temperature T1, the thermostat 43 completely closes the flow path between the cooling water return port 47 and the cooling water outlet 48 and completely opens the flow path between the cooling water bypass passage 49 and the cooling water outlet 48. In this case, the cooling water introduced into the left chamber R1 from the first cooling water inlet 44 or the second cooling water inlet 45 flows in the cooling water bypass passage 49 and the right chamber R2 without flowing in the radiator 33 and returns from the cooling water outlet 48 to the water pump 30.

Also, when the temperature of the cooling water introduced into the right chamber R2 is higher than the reference temperature T1 and is equal to or lower than a predetermined reference temperature T2 (T2>T1), the thermostat 43 opens both the flow path between the cooling water return port 47 and the cooling water outlet 48 and the flow path between the cooling water bypass passage 49 and the cooling water outlet 48, increases an area of the flow path between the cooling water return port 47 and the cooling water outlet 48 and reduces an area of the flow path between the cooling water bypass passage 49 and the cooling water outlet 48 as the temperature of the cooling water introduced into the right chamber R2 increases. In this case, the cooling water introduced into the left chamber R1 from the first cooling water inlet 44 or the second cooling water inlet 45 is split in the left chamber R1, which respectively flows in the radiator 33 and the cooling water bypass passage 49, converges in the right chamber R2 and returns from the cooling water outlet 48 to the water pump 30. Also, in this case, as the temperature of the cooling water increases, an amount of the cooling water flowing in the radiator 33 relative to an amount of the cooling water flowing in the cooling water bypass passage 49 increases.

Also, when the temperature of the cooling water introduced into the right chamber R2 is higher than the reference temperature T2, the thermostat 43 completely opens the flow path between the cooling water return port 47 and the cooling water outlet 48, and completely closes the flow path between the cooling water bypass passage 49 and the cooling water outlet 48. In this case, the cooling water introduced into the left chamber R1 from the first cooling water inlet 44 or the second cooling water inlet 45 flows in the cooling water delivery port 46, the radiator 33, the cooling water return port 47 and the right chamber R2 without flowing in the cooling water bypass passage 49 and returns from the cooling water outlet 48 to the water pump 30.

Herein, the thermostat 43 has a valve seat 43A, a main valve body 43B and a thermoelement 43C configured to move the main valve body 43B and to enable the main valve body 43B to be separated from or to be seated on the valve seat 43A in accordance with the temperature of the cooling water. Further, the thermostat 43 is provided with a sub-valve body 43D configured to move together with the main valve body 43B. The sub-valve body 43D is configured to be separated from or to be seated on a part at which the cooling water bypass passage 49 opens toward the right chamber R2. The thermoelement 43C is configured to move the main valve body 43B and the sub-valve body 43D in accordance with the temperature of the cooling water introduced into the right chamber R2. The main valve body 43B is configured to open and close the flow path between the cooling water return port 47 and the cooling water outlet 48, and the sub-valve body 43D is configured to open and close the flow path between the cooling water bypass passage 49 and the cooling water outlet 48.

The respective parts configuring the cooling system are disposed and connected as follows. That is, as shown in FIG. 16, the water pump 30 is attached to the right side of the crank case 13. Also, the water pump 30 is disposed at a position corresponding to the balance shaft positioned in front of the crankshaft. Also, a path (not shown) along which the cooling water is to be supplied from the water pump 30 to the water jacket is formed between the water pump 30 and the water jacket. Also, the cooling water flow control unit 41 is disposed above the cylinder head cover 16, specifically, at a right-front side above the cylinder head cover 16. Also, as shown in FIG. 19, the outlet-side of the water jacket and the first cooling water inlet 44 of the cooling water flow control unit 41 are interconnected by a cylinder outlet hose 52. Also, the cooling water delivery port 46 of the cooling water flow control unit 41 and the radiator inlet 37 of the upper radiator 34 are interconnected by a radiator inlet hose 53. Also, the radiator outlet 38 of the upper radiator 34 and the cooling water return port 47 of the cooling water flow control unit 41 are interconnected by a radiator outlet hose 54. Also, the cooling water outlet 48 of the cooling water flow control unit 41 and the cooling water intake port 31 of the water pump 30 are interconnected by a water pump inlet hose 55. The radiator inlet hose 53, the radiator outlet hose 54 and the water pump inlet hose 55 are concentrated in a space between the engine 12 and the radiator 33. Also, the cylinder outlet hose 52, the radiator outlet hose 54 and the water pump inlet hose 55 are concentrated in a right region around the engine 12.

Also, as shown in FIG. 16, a right-lower side of the rear surface of the upper radiator 34 is formed with a cooling water supply port 39, the cooling water supply port 39 is connected with a lower end portion of a water injection hose 56 extending in the upper-lower direction, and an upper end portion of the water injection hose 56 is provided with a cooling water injection part 58 having a cooling water injection port 57. Also, a reservoir tank 59 configured to reserve therein the cooling water is provided at the rear of the lower radiator 35, and the reservoir tank 59 is connected to the upper radiator 34 via an overflow pipe line (not shown), for example.

Also, the cooling system of the engine unit 11 has a configuration of supplying the cooling water to the oil cooler 26 and the supercharger 121 so as to cool the engine oil and the supercharger 121. Specifically, the water pump 30 has a cooling water discharge port 32 and is configured to supply the cooling water to the water jacket and to discharge the cooling water from the cooling water discharge port 32. The cooling water discharged from the cooling water discharge port 32 is supplied to the oil cooler 26 and the supercharger 121 via an inlet branch piping 61 disposed in front of the engine 12. Also, as shown in FIG. 18 or 19, the cooling water having cooled the engine oil and the supercharger 121 flows into the second cooling water inlet 45 of the cooling water flow control unit 41 through an outlet branch piping 62 disposed in front of the engine 12 and converges with the cooling water having flowed into the cooling water flow control unit 41 from the water jacket.

(Structures of Intake System and Exhaust System)

Also, as shown in FIG. 15 or 18, the intake system has an air cleaner 115, a supercharger 121, an intercooler 131, an air discharging duct 141, a surge tank 154, an electronic control throttle device 171 and an injector 174.

The air cleaner 115 is a device configured to filter and purify air for fuel combustion introduced from an outside. The air cleaner 115 has a cleaner case 116 and an air filter is provided in the cleaner case 116. Also, the cleaner case 116 is formed with an air intake port 118 configured to introduce the exterior air into the cleaner case 116. Meanwhile, in FIG. 15 or 5, the air intake port 118 is pictorially shown with a dashed-two dotted line. A position of the air intake port 118 can be appropriately set. Also, the air intake port 118 is provided with an air duct (not shown) configured to guide the exterior air into the air intake port 118. Also, as shown in FIG. 18, a front part of the air cleaner 115 is formed with an air outlet 119 for enabling the filtered air to flow from the cleaner case 116.

The supercharger 121 is a supercharger of an exhaust turbine type, and has a turbine unit 122 having a turbine, and a compressor unit 123. The supercharger 121 is configured to drive the turbine of the turbine unit 122 by the exhaust gas from the engine 12, to drive the compressor of the compressor unit 123 by power of the turbine and to compress the air supplied through the air cleaner 115 by the compressor unit 123. By adopting the supercharger 121, it is possible to increase the thermal efficiency and output of the engine 12, to reduce a displacement of the engine 12 and to make the engine small, as compared to the natural intake.

The intercooler 131 is a heat exchanger configured to cool the air of which temperature has increased resulting from the compression by the compressor unit 123 of the supercharger 121. The intercooler 131 is an air-cooling type, and has a passage 132A for flowing the air compressed by the compressor unit 123 and a heat radiation part 132 having fins 132B configured to receive the exterior air and to radiate the heat of the air compressed by the compressor unit 123, as shown in FIG. 18. Also, the heat radiation part 132 has a receiving surface 132C configured to receive the exterior air for heat radiation. Also, a front part of the intercooler 131 is formed with an air inlet 133 for introducing the air supplied from the compressor unit 123 of the supercharger 121 into the passage 132A of the heat radiation part 132. Also, as shown in FIG. 16 or 17, a rear part of the intercooler 131 is formed with an air outlet 134 for supplying the air to the surge tank 154, which has flowed in the passage 132A of the heat radiation part 132 and has been thus cooled.

Also, an air guide duct (not shown) configured to guide the exterior air to the heat radiation part 132 of the intercooler 131 as a cooling air is provided in front of the intercooler 131. Also, as shown in FIG. 17, the air discharging duct 141 configured to discharge the exterior air, which has been guided by the air guide duct, has collided with the heat radiation part 132 of the intercooler 131 and has passed between the fins 132B of the heat radiation part 132, to the outside is provided at the rear of the intercooler 131.

The surge tank 154 is a device configured to rectify the flow of the air compressed by the supercharger 121 and cooled by the intercooler 131. The surge tank 154 has a space for temporarily storing the air cooled by the intercooler 131. Also, in the second illustrative embodiment, the surge tank 154 is formed integrally with the cleaner case 116 of the air cleaner 115. Also, as shown in FIG. 17, an upper-right side of the surge tank 154 is formed with an air inlet 156 for introducing the air supplied from the intercooler 131 into the surge tank 154. Also, a lower part of the surge tank 154 is formed with an air outlet (not shown) for enabling the air temporarily stored in the surge tank 154 to flow to an intake passage formed in a throttle body 172 of the electronic control throttle device 171.

The electronic control throttle device 171 shown in FIG. 15 is a device configured to regulate an amount of the air, which is to pass through the intercooler 131 and the surge tank 154 and is to be supplied to an intake port of the engine 12. The electronic control throttle device 171 has a throttle body 172, a throttle valve provided in the throttle body 172 and configured to open and close an intake passage formed in the throttle body 172, and an electric driving motor 173 configured to drive the throttle valve.

The injector 174 is a device configured to inject the fuel to the intake port of the engine 12. To the injector 174, a delivery pipe 175 configured to supply the fuel from the fuel tank 241 to the injector 174 is connected.

Also, as shown in FIG. 18, the exhaust system has exhaust pipes 191 configured to interconnect exhaust ports of the engine 12 and the turbine unit 122 of the supercharger 121, a muffler joint pipe 192 configured to connect the turbine unit 122 of the supercharger 121 and a muffler-side, a muffler (not shown), and the like. The exhaust pipes 191 configure a part of the engine unit 11. The exhaust pipes 191 are disposed at the front of the engine 12 and between the exhaust ports and the turbine unit 122 of the supercharger 121. In the second illustrative embodiment, the exhaust pipes 191 are integrally formed with a housing of the turbine unit 122 of the supercharger 121. Specifically, one end-sides of the two exhaust pipes 191 are respectively connected to the two exhaust ports of the parallel two-cylinder engine 12. The other end-sides of the exhaust pipes 191 are coupled to each other to form one. The other end portion of the exhaust pipes 191 integrated into one is integrated with the housing of the turbine unit 122 of the supercharger 121. On the other hand, the exhaust pipe 191 and the housing of the turbine unit 122 may be formed as separate members and both members may be connected. Meanwhile, the muffler joint pipe 192 has one end-side connected to the turbine unit 122 of the supercharger 121 and the other end-side passing a lower-right side of the engine 12 and extending rearward toward the muffler. Also, the muffler is disposed at a rear-lower side of the engine 12. The exhaust gas discharged from the respective exhaust ports is supplied into the housing of the turbine unit 122 of the supercharger 121 via the exhaust pipes 191. By the exhaust gas, the turbine of the turbine unit 122 is rotated. Subsequently, the exhaust gas discharged from the turbine unit 122 is supplied to the muffler via the muffler joint pipe 192 and is discharged from the muffler to the outside.

Also, the turbine unit 122 of the supercharger 121 is provided with a waste gate valve 193. That is, the turbine unit 122 is provided therein with a gate configured to circulate a part of the exhaust gas supplied via the exhaust pipes 191 toward the muffler joint pipe 192 without supplying the same to the turbine. The waste gate valve 193 is configured to regulate an inflow amount of the exhaust gas to the turbine by opening and closing the gate.

(Arrangement and Connection of Respective Units of Intake System)

Figure 21:
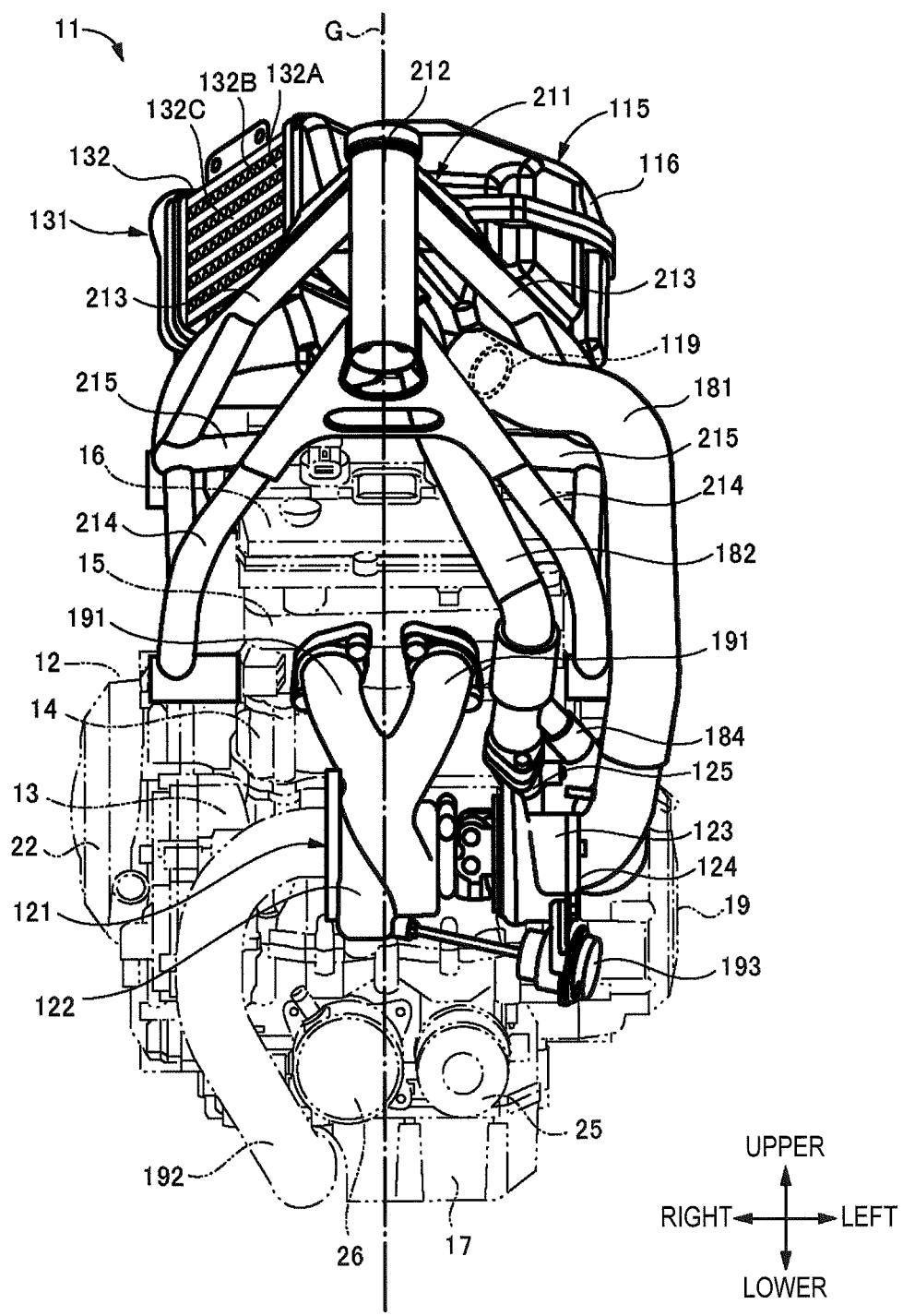
FIG. 21 illustrates arrangement of a vehicle body frame, an air intake pipe, an air outlet pipe and the like of the motorcycle having a supercharger, which is the second illustrative embodiment of the saddle-ridden type vehicle of the disclosure.
Figure 22:
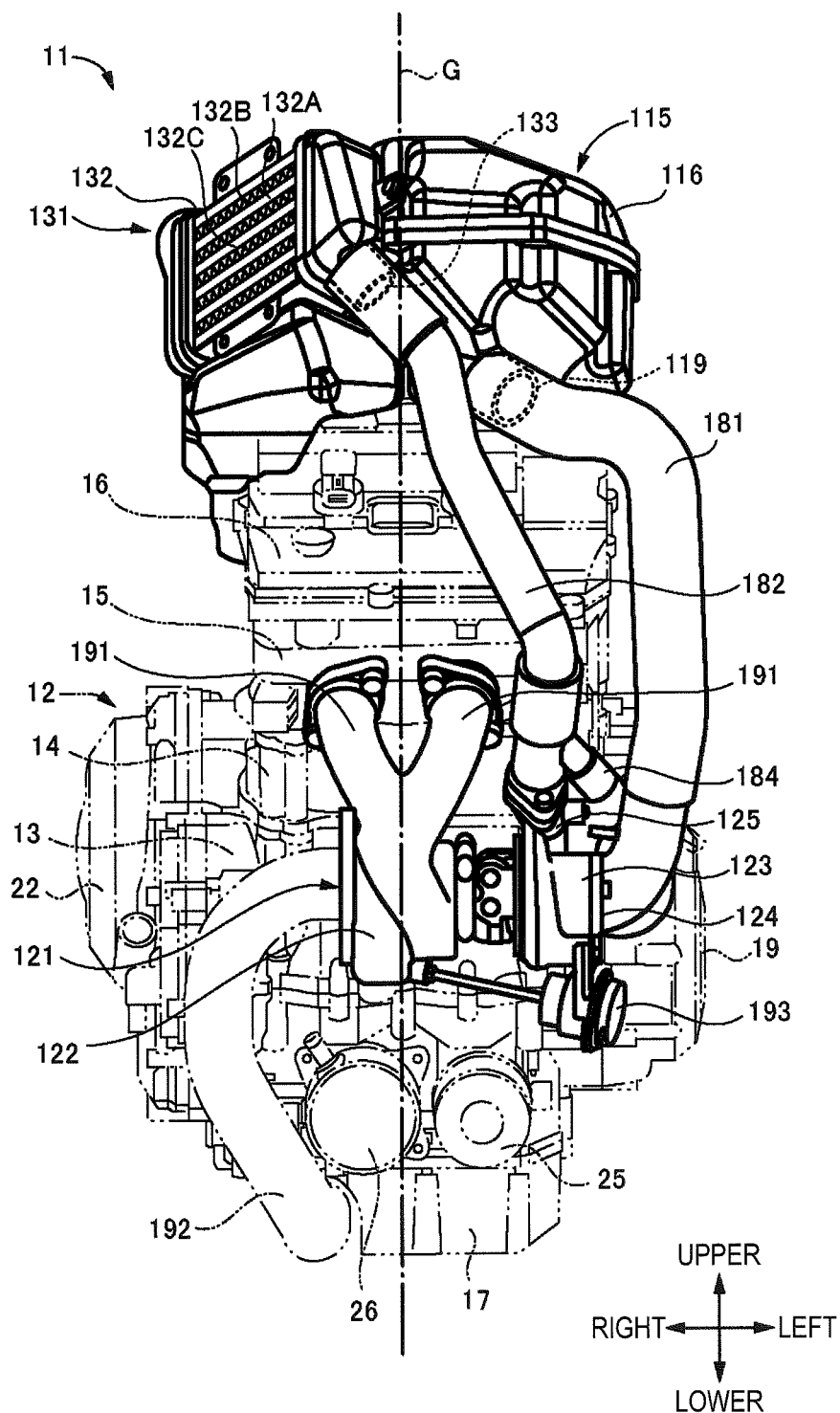
FIG. 22 illustrates arrangement of an air cleaner, the supercharger, an intercooler, the air intake pipe, the air outlet pipe and the like of the motorcycle having a supercharger, which is the second illustrative embodiment of the saddle-ridden type vehicle of the disclosure.
Figure 23:
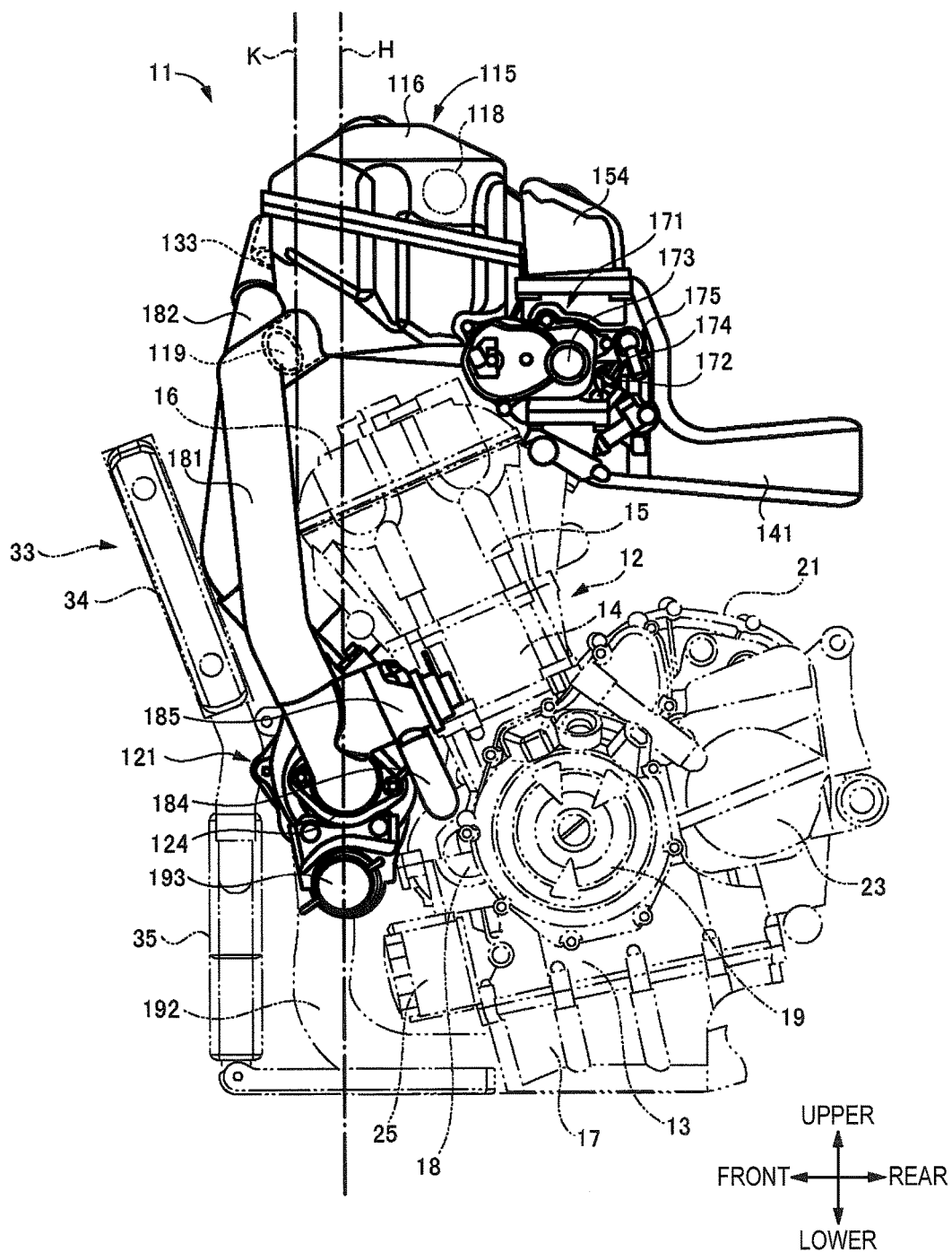
FIG. 23 illustrates arrangement of the engine, a radiator, the air cleaner, the supercharger, the air intake pipe, the air outlet pipe and the like of the motorcycle having a supercharger, which is the second illustrative embodiment of the saddle-ridden type vehicle of the disclosure.

FIGS. 21 to 23 depict arrangement and connection of the respective units configuring the intake system. As shown in FIG. 21, the supercharger 121 is disposed in front of the engine 12, specifically in front of the cylinder 14. Also, as shown in FIG. 23, the supercharger 121 is disposed above the balancer chamber 18 of the engine 12. Also, the supercharger 121 is positioned between the engine 12 and the radiator 33. Also, the supercharger 121 is disposed at a position between the upper radiator 34 and the lower radiator 35, and a front part of the supercharger 121 is positioned in a space between the upper radiator 34 and the lower radiator 35. Also, as shown in FIG. 21, the supercharger 121 is disposed so that the turbine unit 122 becomes a right side and the compressor unit 123 becomes a left side. Also, the turbine unit 122 is positioned below the exhaust ports of the engine 12 at a substantial center of the motorcycle 1 in the right-left direction of the motorcycle 1. Also, the compressor unit 123 is positioned at the left part of the motorcycle 1 and is also positioned at the left of a reference line G, which indicates a center of the motorcycle 1 in the right-left direction of the motorcycle 1.

The air cleaner 115 is disposed at an upper-left side of the engine 12, specifically at an upper-left side of the cylinder head cover 16. Also, as shown in FIG. 15, the air cleaner 115 is positioned above the left main frame 213. Also, as shown in FIG. 23, a front part of the air cleaner 115 is positioned above the supercharger 121. Also, the air cleaner 115 is disposed at a position overlapping with the supercharger 121, as seen in a plan view of the motorcycle 1 (refer to FIG. 17). Also, the air outlet 119 formed at the front part of the air cleaner 115 is positioned just above the supercharger 121. In the meantime, a reference line H in FIG. 23 indicates a position of the supercharger 121 in the front-rear direction.

Also, as shown in FIG. 21, the intercooler 131 is disposed at an upper-right side of the engine 12, specifically at an upper-right side of the cylinder head cover 16. Further, as shown in FIG. 18, the intercooler 131 is disposed above the cooling water flow control unit 41. Also, as shown in FIG. 16, the intercooler 131 is disposed above the right main frame 213. Also, the front part of the intercooler 131 is disposed above the supercharger 121. Also, as seen in a plan view of the motorcycle 1, the intercooler 131 is disposed at a position overlapping with the supercharger 121 (refer to FIG. 17). Also, the air inlet 133 formed at the front part of the intercooler 131 is positioned just above the supercharger 121. In the meantime, the reference line H in FIG. 16 indicates a position of the supercharger 121 in the front-rear direction, like the reference line H in FIG. 23. Also, as shown in FIG. 21, the intercooler 131 is positioned at the right of the reference line G, which indicates the center of the motorcycle 1 in the right-left direction of the motorcycle 1. That is, the intercooler 131 is disposed at an opposite position to the compressor unit 123 of the supercharger 121 with respect to the right-left direction. Also, as shown in FIG. 17, the intercooler 131 is disposed so that the receiving surface 132C of the heat radiation part 132 is parallel with a part, which obliquely extends toward the right-rear side, of the front end portion of the right main frame 213. In the meantime, a reference line J in FIG. 17 indicates the extension direction of the front end portion of the right main frame 213.

Also, as shown in FIG. 22, the air cleaner 115 and the intercooler 131 are arranged side by side in the right-left direction above the engine 12 and are adjacent to each other. In the second illustrative embodiment, the intercooler 131 is attached to the right side of the air cleaner 115. Also, as shown in FIG. 17, the air cleaner 115 and the intercooler 131 are positioned between the leftmost part of the left main frame 213 and the rightmost part of the right main frame 213, as seen in a plan view of the motorcycle 1. That is, the air cleaner 115 is positioned at the right of a left surface of the leftmost convex part of the left main frame 213, and the intercooler 131 is positioned at the left of a right surface of the rightmost convex part of the right main frame 213. In the meantime, a reference line E in FIG. 17 indicates a position of the left surface of the leftmost convex part of the left main frame 213 in the right-left direction, and a reference line F indicates a position of the right surface of the rightmost convex part of the right main frame 213 in the right-left direction.

Also, as shown in FIG. 22, the air cleaner 115 and the compressor unit 123 of the supercharger 121 are interconnected by an air intake pipe 181. One end portion of the air intake pipe 181 is connected to the air outlet 119 of the air cleaner 115. A connection part between the air intake pipe 181 and the air outlet 119 of the air cleaner 115 is positioned above the supercharger 121, as shown in FIG. 23. Also, a position of the connection part in the front-rear direction is the same as the position of the front end portion of the cylinder head cover 16. A reference line K in FIG. 23 indicates a position of the front end portion of the cylinder head cover 16 in the front-rear direction. In the meantime, the position of the connection part in the front-rear direction may be set in front of the position of the front end portion of the cylinder head cover 16. Also, the other end portion of the air intake pipe 181 is connected to the air intake port 124 formed at a left part of the compressor unit 123 of the supercharger 121 and opening leftward. Also, as shown in FIG. 21, the air intake pipe 181 extends in the upper-lower direction in a region from the above of the engine 12 to the front thereof at the left of the engine 12. Specifically, the air intake pipe 181 extends by a short distance from the air outlet 119 of the air cleaner 115 toward a left-lower side and passes between the left main frame 213 and the left down tube 214. Then, the air intake pipe 181 extends downward with being bent, is bent rightward and reaches the air intake port 124 of the compressor unit 123 of the supercharger 121. In the second illustrative embodiment, the air intake pipe 181 passes through the left (outer side) of the left down tube 214 and is disposed close to the left down tube 214 so as to be adjacent to the center of the motorcycle 1 in the right-left direction of the motorcycle 1 as close as possible. As a result, the leftmost protruding part of the air intake pipe 181 is substantially the same as the left surface of the magneto chamber 19 of the engine 12 or is piped to be positioned at the right thereof. Also, the air intake pipe 181 is entirely positioned at the left of the reference line G. Also, the air intake pipe 181 has both bent end portions, as described above. However, most of the air intake pipe except for both end portions extends linearly.

Also, as shown in FIG. 22, the compressor unit 123 of the supercharger 121 and the intercooler 131 are interconnected by an air outlet pipe 182. One end portion of the air outlet pipe 182 is connected to the air discharge port 125 formed at an upper part of the compressor unit 123 of the supercharger 121 and opening upward. Also, the other end portion of the air outlet pipe 182 is connected to the air inlet 133 of the intercooler 131. A connection part between the air outlet pipe 182 and the intercooler 131 is positioned above the supercharger 121, as shown in FIG. 23. Also, a position of the connection part in the front-rear direction is the same as the position of the front end portion of the cylinder head cover 16. On the other hand, the position of the connection part in the front-rear direction may be set in front of the position of the front end portion of the cylinder head cover 16. Also, as shown in FIG. 22, the air outlet pipe 182 extends in the region from the above of the engine 12 to the front thereof at the left of the engine 12. Also, the air outlet pipe 182 is positioned at the right of the air intake pipe 181, and is positioned at an inner side of the motorcycle 1 relative to the air intake pipe 181. Also, as shown in FIG. 21, the air outlet pipe 182 passes between the pair of main frames 213 and between the pair of down tubes 214. Also, as shown in FIG. 22, the air inlet 133 of the intercooler 131 is positioned at the right of the air discharge port 125 of the compressor unit 123 of the supercharger 121. Therefore, the air outlet pipe 182 is inclined rightward as it faces upward. However, most of the air outlet pipe 182 except for an upper end portion is positioned at the left of the reference line G. Also, the air outlet pipe 182 extends linearly as a whole.

Also, as shown in FIG. 21, the air intake pipe 181 and the air outlet pipe 182 are piped with the left down tube 214 being interposed therebetween. That is, the air intake pipe 181, the left down tube 214 and the air outlet pipe 182 are disposed in corresponding order from the left side of the motorcycle 1 toward the right (from the left outer side toward the inner side). Also, the air intake pipe 181 and the air outlet pipe 182 are respectively piped along the left down tube 214 extending from the center of the motorcycle 1 in the right-left direction of the motorcycle 1 toward the left-lower side, as seen in a front view of the motorcycle 1.

Also, as shown in FIG. 23, both the air intake pipe 181 and the air outlet pipe 182 are disposed in front of the engine 12, i.e., between the engine 12 and the radiator 33. That is, one end-side of the air intake pipe 181 is connected to the air outlet 119 of the air cleaner 115 positioned above the front end portion of the cylinder head cover 16, and the other end-side of the air intake pipe 181 is connected to the compressor unit 123 of the supercharger 121 disposed between the engine 12 and the radiator 33, so that the air intake pipe 181 is substantially entirely positioned between the engine 12 and the radiator 33 or in a space just above thereof. Also, one end-side of the air outlet pipe 182 is connected to the compressor unit 123 of the supercharger 121 disposed between the engine 12 and the radiator 33, and the other end-side of the air outlet pipe 182 is connected to the air inlet 133 of the intercooler 131 positioned above the front end portion of the cylinder head cover 16, so that the air outlet pipe 182 is entirely positioned between the engine 12 and the radiator 33 or in the space just above thereof.

In the meantime, as shown in FIG. 17, the surge tank 154 is disposed at the upper-rear side of the engine 12. Specifically, the surge tank 154 is disposed adjacent to the air cleaner 115 in the front-rear direction at the rear of the air cleaner 115. Also, the surge tank 154 is disposed close to the intercooler 131 disposed adjacent to the right side of the air cleaner 115. Also, as seen in a plan view of the motorcycle 1, the air cleaner 115, the intercooler 131 and the surge tank 154 are disposed in a triangular shape in a region above the engine 12 (for example, when the centers of the three components are linearly connected, a triangle is formed in the region above the engine 12).

Also, the intercooler 131 and the surge tank 154 are interconnected by a connecting pipe 183. The connecting pipe 183 is disposed at a right-rear side above the engine 12. Specifically, one end portion of the connecting pipe 183 is connected to the air outlet 134 of the intercooler 131, and the other end portion is connected to the air inlet 156 of the surge tank 154. Since the air outlet 134 of the intercooler 131 and the air inlet 156 of the surge tank 154 are disposed close to each other, a length of the connecting pipe 183 configured to connect them is short.

Also, as shown in FIG. 15, the throttle body 172 of the electronic control throttle device 171 is disposed between the surge tank 154 and the intake port of the engine 12 at a rear-upper side of the engine 12.

In the intake system connected as described above, the air introduced from the outside normally sequentially passes through the air cleaner 115, the air intake pipe 181, the compressor unit 123 of the supercharger 121, the air outlet pipe 182, the intercooler 131, the connecting pipe 183, the surge tank 154 and the throttle body 172 of the electronic control throttle device 171, and is then supplied to the intake port of the engine 12.

(Bypass Between Upstream and Downstream Sides of Supercharger)

Also, as shown in FIG. 23, the intake system of the motorcycle 1 is provided with an air bypass piping 184 and configured to interconnect the air intake pipe 181 and the air outlet pipe 182 without interposing the compressor unit 123 of the supercharger 121 and an air bypass valve 185 configured to switch communication and cutoff of the air bypass piping 184. The air bypass valve 185 opens when the throttle valve is completely closed upon deceleration, for example. Thereby, the air outlet pipe 182 and the air intake pipe 181 are enabled to communicate with each other via the air bypass piping 184 and the compressed air downstream of the compressor unit 123 of the supercharger 121 is escaped upstream, so that a downstream pressure of the compressor unit 123 is lowered.

The air bypass valve 185 is attached to the air intake pipe 181. Also, the air bypass valve 185 is disposed at the rear of a slightly upper part of the air intake pipe 181 relative to the end portion close to the compressor unit 123 of the supercharger 121. Also, the air bypass valve 185 is disposed above the crank case 13 of the engine 12, and is also disposed at a position overlapping with the front part of the cylinder 14, as seen in a side view of the motorcycle 1.

Also, the air bypass piping 184 has one end portion connected to the air bypass valve 185 and the other end portion connected to a slightly upper part of the end portion of the air outlet pipe 182 close to the supercharger 121. Both the air intake pipe 181 and the air outlet pipe 182 extend in the same direction, i.e., upward from the compressor unit 123 of the supercharger 121 and are disposed adjacent to each other. Therefore, a length of the air bypass piping 184 configured to interconnect the air intake pipe 181 (the air bypass valve 185) and the air outlet pipe 182 is short.

On the other hand, the air bypass valve 185 may be attached to the air outlet pipe 182, one end portion of the air bypass piping 184 may be connected to the air intake pipe 181, and the other end portion may be connected to the air bypass valve 185.

As described above, according to the motorcycle 1, which is the second illustrative embodiment of the saddle-ridden type vehicle of the disclosure, both the air intake pipe 181 and the air outlet pipe 182 extend in the upper-lower direction in the region ranging from the above of the engine 12 to the front thereof and do not traverse laterally the engine 12. Therefore, it is possible to expose the side surface of the cylinder 14 or cylinder head 15 and to make an outward appearance of the motorcycle 1 better, thereby improving a design property. Also, since the air intake pipe 181 and the air outlet pipe 182 are not disposed at the side of the engine 12, the traveling wind can easily collide with the engine 12 from the side, so that it is possible to increase the cooling performance of the engine 12. Also, it is possible to easily secure a space for arranging the components at the side of the engine 12. Also, it is possible to reduce the vehicle width, thereby increasing a handling property of the motorcycle 1. Also, since both the air intake pipe 181 and the air outlet pipe 182 are concentrated at the left in the region ranging from the above of the engine 12 to the front thereof, it is possible to form an empty space at the right in the region ranging from the above of the engine 12 to the front thereof and to dispose the radiator fan 40 and the cooling water piping such as the water inlet hose 55 in the space.

Also, the air intake pipe 181 and the air outlet pipe 182 are piped with the left down tube 214 being interposed therebetween, the air intake pipe 181 passes the left (outer side) of the left down tube 214 and the air outlet pipe 182 passes the right (inner side) of the left down tube 214. Further, the air intake pipe 181 and the air outlet pipe 182 are piped along the left down tube 214. The pipes are arranged in such a manner, so that it is possible to dispose the air intake pipe 181 and the air outlet pipe 182 with a margin in the region ranging from the above of the engine 12 to the front thereof. Also, it is possible to linearly pipe the air intake pipe 181 and the air outlet pipe 182 without largely bending the same.

Also, the air cleaner 115 and the intercooler 131 are arranged side by side in the right-left direction above the engine 12 and the air outlet 119 of the air cleaner 115 and the air inlet 133 of the intercooler 131 are positioned at the upper-front side of the engine 12. Therefore, it is possible to easily dispose both the air intake pipe 181 and the air outlet pipe 182 in the region ranging from the above of the engine 12 to the front thereof by connecting the air intake pipe 181 to the air outlet 119 of the air cleaner 115 and connecting the air outlet pipe 182 to the air inlet 133 of the intercooler 131. Also, it is possible to linearly dispose both the air intake pipe 181 and the air outlet pipe 182 in the upper-lower direction and to shorten the same.

Also, the compressor unit 123 of the supercharger 121 is disposed at the front-left side of the engine 12. Therefore, it is possible to easily dispose both the air intake pipe 181 and the air outlet pipe 182 in the region ranging from the above of the engine 12 to the front thereof by connecting the air intake pipe 181 and the air outlet pipe 182 to the air intake port 124 and air discharge port 125 of the compressor unit 123.

As described above, according to the motorcycle 1, which is the second illustrative embodiment of the saddle-ridden type vehicle of the disclosure, both the air intake pipe 181 and the air outlet pipe 182 extend in the upper-lower direction between the engine 12 and the radiator 33 and do not traverse laterally the cylinder 14 or cylinder head 15. Therefore, it is possible to expose the side surface of the cylinder 14 or cylinder head 15 and to make an outward appearance of the motorcycle 1 better, thereby improving a design property. Also, since the air intake pipe 181 and the air outlet pipe 182 are not disposed at the side of the engine 12, the traveling wind can easily collide with the engine 12 from the side, so that it is possible to increase the cooling performance of the engine 12. Also, it is possible to easily secure a space for arranging the components at the side of the engine 12. Also, it is possible to reduce the vehicle width, thereby increasing a handling property of the motorcycle 1. Also, since both the air intake pipe 181 and the air outlet pipe 182 are concentrated at the left in the region between the engine 12 and the radiator 33, it is possible to form an empty space at the right in a region ranging from the above of the engine 12 to the front thereof and to dispose the radiator fan 40 and the cooling water piping such as the water inlet hose 55 in the space. Also, since the air intake pipe 181 and the air outlet pipe 182 are concentrated between the engine 12 and the radiator 33, it is possible to easily conceal the air intake pipe 181 and the air outlet pipe 182 by covering the right and left sides of the region between the engine 12 and the radiator 33 with a cowl. As a result, it is possible to improve the outward appearance of the motorcycle 1.

Also, the air cleaner 115 and the intercooler 131 are arranged side by side in the right-left direction above the engine 12 and the air outlet 119 of the air cleaner 115 and the air inlet 133 of the intercooler 131 are positioned at the upper-front side of the engine 12. Also, the positions of the air outlet 119 of the air cleaner 115 and the air inlet 133 of the intercooler 131 in the front-rear direction are the same as the position of the front end portion of the cylinder head cover 16. Therefore, it is possible to easily dispose both the air intake pipe 181 and the air outlet pipe 182 between the engine 12 and the radiator 33 by connecting the air intake pipe 181 to the air outlet 119 of the air cleaner 115 and connecting the air outlet pipe 182 to the air inlet 133 of the intercooler 131. Also, it is possible to linearly dispose both the air intake pipe 181 and the air outlet pipe 182 in the upper-lower direction and to shorten the same.

Also, the compressor unit 123 of the supercharger 121 is disposed at the front-left side of the engine 12. Therefore, it is possible to easily dispose both the air intake pipe 181 and the air outlet pipe 182 in the left region between the engine 12 and the radiator 33 by connecting the air intake pipe 181 and the air outlet pipe 182 to the air intake port 124 and air discharge port 125 of the compressor unit 123.

Also, since the supercharger 121 is disposed in front of the cylinder 14 or above the balancer chamber 18 and is also disposed at the intermediate part of the engine 12 in the upper-lower direction or at the position above the intermediate part, the compressor unit 123 of the supercharger 121 comes close to the air cleaner 115 and the intercooler 131, respectively. Therefore, it is possible to shorten the air intake pipe 181 and the air outlet pipe 182 and to reduce the resistance against the air flowing through the pipes, thereby increasing the response of the engine or decreasing the turbo lag.

In the second illustrative embodiment, as shown in FIG. 18, the components of the cooling system such as the water pump 30, the cooling water flow control unit 41, the water pump inlet hose 55 and the like are disposed at the right side of the motorcycle 1, and the components of the intake system such as the air cleaner 115, the compressor unit 123 of the supercharger 121, the air intake pipe 181, the air outlet pipe 182 and the like are disposed at the left side of the motorcycle 1. However, the disclosure is not limited thereto. For example, the arrangements of the components may be reversed with respect to the right-left direction.

Also, the disclosure can be applied to a saddle-ridden type vehicle having a general unified radiator, which is not divided into an upper radiator and a lower radiator. Also, a thermostat having no sub-valve body may be used as the thermostat 43 of the cooling water flow control unit 41, and the flow path between the cooling water bypass passage 49 and the cooling water outlet 48 may be opened all the time, regardless of the temperature of the cooling water. Also, the saddle-ridden type vehicle of the disclosure is not limited to the motorcycle, and can be applied to a variety of saddle-ridden type vehicles such as a three-wheeled vehicle, a buggy car or the like having an engine.

Also, the disclosure can be appropriately changed without departing from the gist or spirit of the inventions that can be understood from the claims and the entire specification, and a saddle-ridden type vehicle having the change is also included in the technical spirit of the disclosure.

What is claimed is:

1. A saddle-ridden vehicle comprising:
   an engine having a cylinder and a cylinder head above a crank case;
   an air cleaner configured to purify air for fuel combustion;
   a supercharger configured to compress the air purified by the air cleaner;
   an intercooler configured to cool the air compressed by the supercharger and to supply the air to the engine;
   an air intake piping connected between the air cleaner and the supercharger and configured to supply the air purified by the air cleaner to the supercharger;
   an air outlet piping connected between the supercharger and the intercooler and configured to supply the air compressed by the supercharger to the intercooler;
   an air bypass passage provided between the air outlet piping and the air intake piping and configured to allow the compressed air downstream of the supercharger to escape toward an upstream side of the supercharger without flowing the compressed air in the supercharger; and
   an air bypass valve configured to open and close the air bypass passage,
   wherein the supercharger is disposed in front of the engine,
   wherein the air cleaner is disposed above the engine,
   wherein the air intake piping extends in an upper-lower direction in a region ranging from above the engine to a front of the engine at one side in a vehicle width direction, and
   wherein the air bypass valve is disposed at the rear of the air intake piping.

2. The saddle-ridden vehicle according to claim 1, wherein the air bypass valve is disposed at a position higher than the crank case.

3. The saddle-ridden vehicle according to claim 1, wherein the air bypass valve is disposed at one side in the vehicle width direction relative to one side surface of the cylinder in the vehicle width direction.

4. The saddle-ridden vehicle according to claim 1, wherein the air bypass valve is disposed at a position overlapping with the cylinder, as seen in a side view of the saddle-ridden vehicle.

5. The saddle-ridden vehicle according to claim 1, wherein the air outlet piping is positioned between the air bypass valve and the supercharger.

6. The saddle-ridden vehicle according to claim 1,
   wherein the intercooler is disposed above the engine,
   wherein the air outlet piping is disposed at the other side in the vehicle width direction relative to the air intake piping and extends in the substantially same direction as the air intake piping in the region ranging from above the engine to the front of the engine at the one side in the vehicle width direction, and
   wherein the air bypass passage is formed by a piping configured to interconnect the air intake piping and the air outlet piping.

7. A saddle-ridden vehicle comprising:
   a vehicle body frame having a head pipe and a pair of frame members each of which is connected to the head pipe and extends rearward from the head pipe expanding toward one side and the other side in a vehicle width direction, respectively;
   an engine supported between the pair of frame members;
   an air cleaner configured to purify air for fuel combustion;
   a supercharger configured to compress the air purified by the air cleaner;
   an intercooler configured to cool the air compressed by the supercharger and to supply the air to the engine;
   an air intake piping connected between the air cleaner and the supercharger and configured to supply the air purified by the air cleaner to the supercharger; and
   an air outlet piping connected between the supercharger and the intercooler and configured to supply the air compressed by the supercharger to the intercooler,
   wherein the supercharger is disposed in front of the engine,
   wherein the air cleaner and the intercooler are disposed above the engine and the supercharger, and
   wherein both the air intake piping and the air outlet piping extend in an upper-lower direction in a region ranging from above the engine to the front of the engine at one side in the vehicle width direction.

8. The saddle-ridden vehicle according to claim 7, wherein the air intake piping and the air outlet piping are piped with one of the pair of frame members at one side in the vehicle width direction being interposed between the air intake piping and the air outlet piping.

9. The saddle-ridden vehicle according to claim 7, wherein the air outlet piping passes between the pair of frame members and the air intake piping passes an outer side of a space between the pair of frame members.

10. The saddle-ridden vehicle according to claim 7, wherein the air cleaner and the intercooler are arranged side by side in the vehicle width direction.

11. The saddle-ridden vehicle according to claim 7,
wherein the supercharger comprises a turbine unit having a turbine configured to drive by an exhaust gas of the engine and a compressor unit configured to drive by power of the turbine and to compress the air, and
wherein the supercharger is disposed so that the compressor unit is positioned at one side in the vehicle width direction relative to the turbine unit.

12. The saddle-ridden vehicle according to claim 7, wherein the air intake piping and the air outlet piping are piped along one of the pair of frame members at one side in the vehicle width direction.

13. A saddle-ridden vehicle comprising:
an engine having a crank case, a cylinder and a cylinder head provided above the crank case, and a cylinder head cover provided above the cylinder head;
a radiator provided in front of the engine and configured to cool cooling water for cooling the engine by traveling wind;
an air cleaner configured to purify air for fuel combustion;
a supercharger configured to compress the air purified by the air cleaner;
an intercooler configured to cool the air compressed by the supercharger and to supply the air to the engine;
an air intake piping connected between the air cleaner and the supercharger and configured to supply the air purified by the air cleaner to the supercharger; and
an air outlet piping connected between the supercharger and the intercooler and configured to supply the air compressed by the supercharger to the intercooler,
wherein the supercharger is disposed between the engine and the radiator,
wherein the air cleaner and the intercooler are disposed above the engine and the supercharger, and
wherein both the air intake piping and the air outlet piping extend in an upper-lower direction between the engine and the radiator.

14. The saddle-ridden vehicle according to claim 13, wherein the air cleaner and the intercooler are arranged side by side in a vehicle width direction.

15. The saddle-ridden vehicle according to claim 13, wherein the air intake piping and the air outlet piping are arranged at one side in a vehicle width direction.

16. The saddle-ridden vehicle according to claim 13,
wherein the supercharger comprises a turbine unit having a turbine configured to drive by an exhaust gas of the engine and a compressor unit configured to drive by power of the turbine and to compress the air, and
wherein the supercharger is disposed so that the compressor unit is positioned at one side in a vehicle width direction relative to the turbine unit.

17. The saddle-ridden vehicle according to claim 13,
wherein the air cleaner has an outlet to which an end portion of the air intake piping is connected and which is configured to enable the purified air to flow to the air inlet piping,
wherein the intercooler has an inlet to which an end portion of the air outlet piping is connected and which is configured to enable the air from the air outlet piping to flow into the intercooler, and
wherein positions of the outlet of the air cleaner and the inlet of the intercooler in a front-rear direction of the saddle-ridden vehicle are the same as a position of a front end portion of the cylinder head cover or are located in front of the position of the front end portion of the cylinder head cover.

18. The saddle-ridden vehicle according to claim 13, wherein the supercharger is disposed in front of the cylinder.

* * * * *